(12) United States Patent
Faith et al.

(10) Patent No.: US 8,761,809 B2
(45) Date of Patent: Jun. 24, 2014

(54) TRANSACTION USING A MOBILE DEVICE WITH AN ACCELEROMETER

(75) Inventors: Patrick Faith, Pleasanton, CA (US); Mark Carlson, Half Moon Bay, CA (US); Ayman Hammad, Pleasanton, CA (US); Ben Rewis, Oakland, CA (US); Kris Koganti, Cupertino, CA (US)

(73) Assignee: Visa International Services Association, San Francisco, CA (US)

( * ) Notice: Subject to any disclaimer, the term of this patent is extended or adjusted under 35 U.S.C. 154(b) by 211 days.

(21) Appl. No.: 12/952,811

(22) Filed: Nov. 23, 2010

(65) Prior Publication Data

US 2011/0189981 A1 Aug. 4, 2011

Related U.S. Application Data

(60) Provisional application No. 61/264,543, filed on Nov. 25, 2009.

(51) Int. Cl.
*H04W 24/00* (2009.01)

(52) U.S. Cl.
USPC ........ 455/456.6; 455/406; 455/408; 455/411; 455/414.1; 455/41.2; 705/35; 705/39; 705/41

(58) Field of Classification Search
USPC ........... 455/456.6, 406–408, 410–411, 414.1, 455/414.3, 41.2, 41.3, 550.1, 556.1; 705/35, 39, 41
See application file for complete search history.

(56) References Cited

U.S. PATENT DOCUMENTS

| | | |
|---|---|---|
| 6,295,448 B1 | 9/2001 | Hayes, Jr. et al. |
| 6,587,835 B1 | 7/2003 | Treyz et al. |
| 7,089,208 B1 | 8/2006 | Levchin et al. |
| 7,280,096 B2 | 10/2007 | Marvit et al. |
| 7,360,248 B1 | 4/2008 | Kanevsky et al. |
| 7,366,522 B2 | 4/2008 | Thomas |

(Continued)

FOREIGN PATENT DOCUMENTS

| | | | |
|---|---|---|---|
| JP | 2007/058757 A | 3/2007 |
| KR | 10-2006-0135340 A | 12/2006 |

(Continued)

OTHER PUBLICATIONS

International Search Report, mailed Jul. 26, 2011 in PCT/US2010/057997, 10 pages.

(Continued)

*Primary Examiner* — Marcos Torres
(74) *Attorney, Agent, or Firm* — Kilpatrick Townsend Stockton LLP

(57) ABSTRACT

Embodiments of the invention may use a first accelerometer to measure first acceleration data of a first device. Other interaction data, including time data and geographic location data, generated by the first device may also be recorded. First acceleration data is compared by a remote server computer to second acceleration data generated by a second accelerometer in a second device. If the first and second accelerometer data are substantially equal, it can be determined that the devices have interacted and communications can be initiated. After communications are initiated, a financial transaction is conducted. Accelerometer data may be stored and/or used as part of the authentication process in a payment processing network. Other embodiments of the invention use the accelerometer to generate movement security data to make financial transaction more secure. Accelerometer data is used for authentication, security, encryption, session keys, non-repudiation, or fraud protection.

26 Claims, 13 Drawing Sheets

(56) References Cited

U.S. PATENT DOCUMENTS

| | | | |
|---|---|---|---|
| 7,420,464 | B2 | 9/2008 | Fitzgerald et al. |
| 7,427,926 | B2 | 9/2008 | Sinclair et al. |
| 7,463,143 | B2 | 12/2008 | Forr et al. |
| 7,575,177 | B2 | 8/2009 | Killian et al. |
| 7,657,486 | B2 | 2/2010 | Smets et al. |
| 7,774,231 | B2 | 8/2010 | Pond et al. |
| 7,971,156 | B2 | 6/2011 | Albertson et al. |
| 8,255,323 | B1 * | 8/2012 | Casey et al. ............ 705/39 |
| 8,285,639 | B2 * | 10/2012 | Eden et al. ............ 705/39 |
| 2001/0047488 | A1 | 11/2001 | Verplaetse et al. |
| 2004/0254868 | A1 | 12/2004 | Kirkland et al. |
| 2006/0186994 | A1 | 8/2006 | Lin et al. |
| 2006/0256074 | A1 | 11/2006 | Krum et al. |
| 2006/0265238 | A1 | 11/2006 | Perrier et al. |
| 2007/0003061 | A1 | 1/2007 | Jung et al. |
| 2007/0008133 | A1 | 1/2007 | Kang |
| 2007/0188323 | A1 | 8/2007 | Sinclair et al. |
| 2007/0213045 | A1 | 9/2007 | Hermansson et al. |
| 2007/0223476 | A1 | 9/2007 | Fry |
| 2008/0041936 | A1 | 2/2008 | Vawter |
| 2008/0147461 | A1 | 6/2008 | Lee et al. |
| 2008/0175443 | A1 | 7/2008 | Kahn et al. |
| 2008/0249864 | A1 | 10/2008 | Angell et al. |
| 2009/0065575 | A1 | 3/2009 | Phillips et al. |
| 2009/0066647 | A1 | 3/2009 | Kerr et al. |
| 2009/0143104 | A1 | 6/2009 | Loh et al. |
| 2009/0153342 | A1 | 6/2009 | Thorn |
| 2009/0167486 | A1 | 7/2009 | Shah et al. |
| 2009/0192937 | A1 | 7/2009 | Griffin et al. |
| 2009/0262069 | A1 | 10/2009 | Huntington |
| 2009/0320123 | A1 | 12/2009 | Yu et al. |
| 2010/0075666 | A1 * | 3/2010 | Garner .............. 455/426.1 |
| 2011/0029400 | A1 * | 2/2011 | Scipioni ............ 705/26.4 |

FOREIGN PATENT DOCUMENTS

| | | |
|---|---|---|
| KR | 10/2006/01354340 A | 12/2006 |
| KR | 10-2007-0045765 A | 5/2007 |
| KR | 10/2007/0045765 A | 5/2007 |
| KR | 10/2010/0097644 A | 3/2010 |
| KR | 10-2010-0097644 A | 9/2010 |
| WO | WO 2004/062131 A1 | 7/2004 |
| WO | WO 2009/105115 A2 | 8/2009 |
| WO | WO 2010/039337 A2 | 4/2010 |

OTHER PUBLICATIONS

International Search Report mailed Jul. 27, 2011 in PCT/US2010/058014, 11 pages.

International Search Report mailed Aug. 25, 2011 in PCT/US2010/058005, 10 pages.

International Search Report mailed Aug. 2, 2011 in PCT/US2010/058016, 11 pages.

International Search Report in PCT/US2011/067421, mailed on Aug. 29, 2012. 10 pages.

International Search Report in PCT/US2010/057997, mailed Jun. 7, 2012. 7 pages.

International Search Report in PCT/US2010/058016, mailed Jun. 7, 2012. 8 pages.

International Search Report in PCT/US2010/058005, mailed Jun. 7, 2012. 7 pages.

International Search Report in PCT/US2010/058014, mailed Jun. 7, 2012. 8 pages.

Fisher, Jon, "The nex Bump Technologies should bump Sequoia," Jon Fisher Blog: The next Bump Technology; http://blogspot.com/../next-bump-technology, (Apr. 13, 2010), 2 pages.

PayPal iPhone App update on Mar. 17, 2010, iTunes Screen shot, (retrieved from: iTunes > App store > Finance > PayPal, an eBay Company), 1 page.

Matt Hamblen, Bump App Draws Buzz at CTIA, Oct. 8, 2009.

Final Office Action of May 15, 2013 for U.S. Appl. No. 12/953,372.

Final Office Action issued Jul. 30, 2013 in U.S. Appl. No. 12/953,371, filed Nov. 23, 2010, 26 pages.

Non-Final Office Action issued Aug. 15, 2013 in U.S. Appl. No. 12/953,368, filed Nov. 23, 2010, 29 pages.

Non-Final Office Action issued Dec. 28, 2012 in U.S. Appl. No. 12/953,371, filed Nov. 23, 2010, 18 pages.

Non-Final Office Action issued Feb. 6, 2013 in U.S. Appl. No. 12/953,372, filed Nov. 23, 2010, 8 pages.

Non-Final Office Action issued on Dec. 16, 2013 in U.S. Appl. No. 12/953,371, filed Nov. 23, 2010, 26 pages.

* cited by examiner

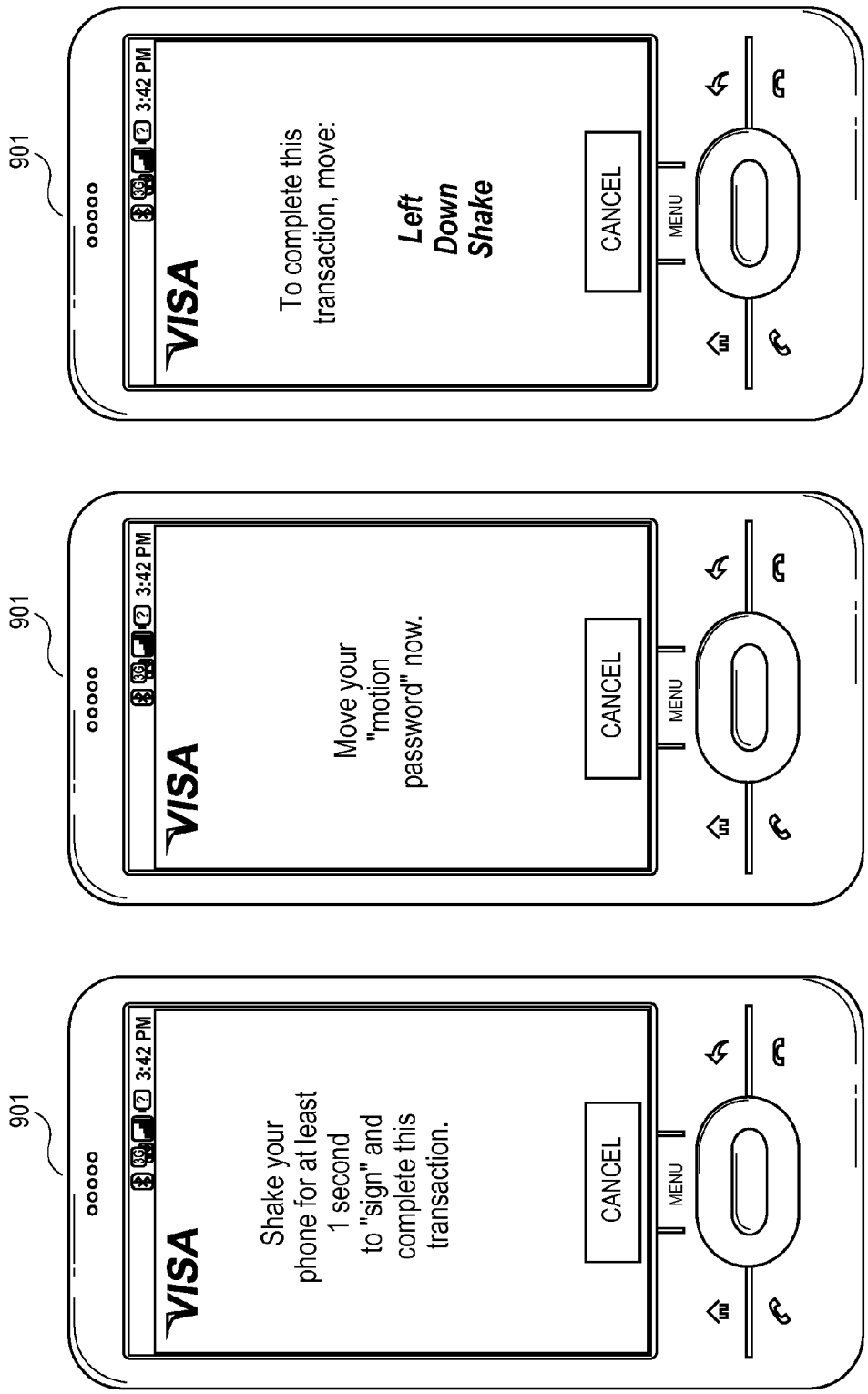

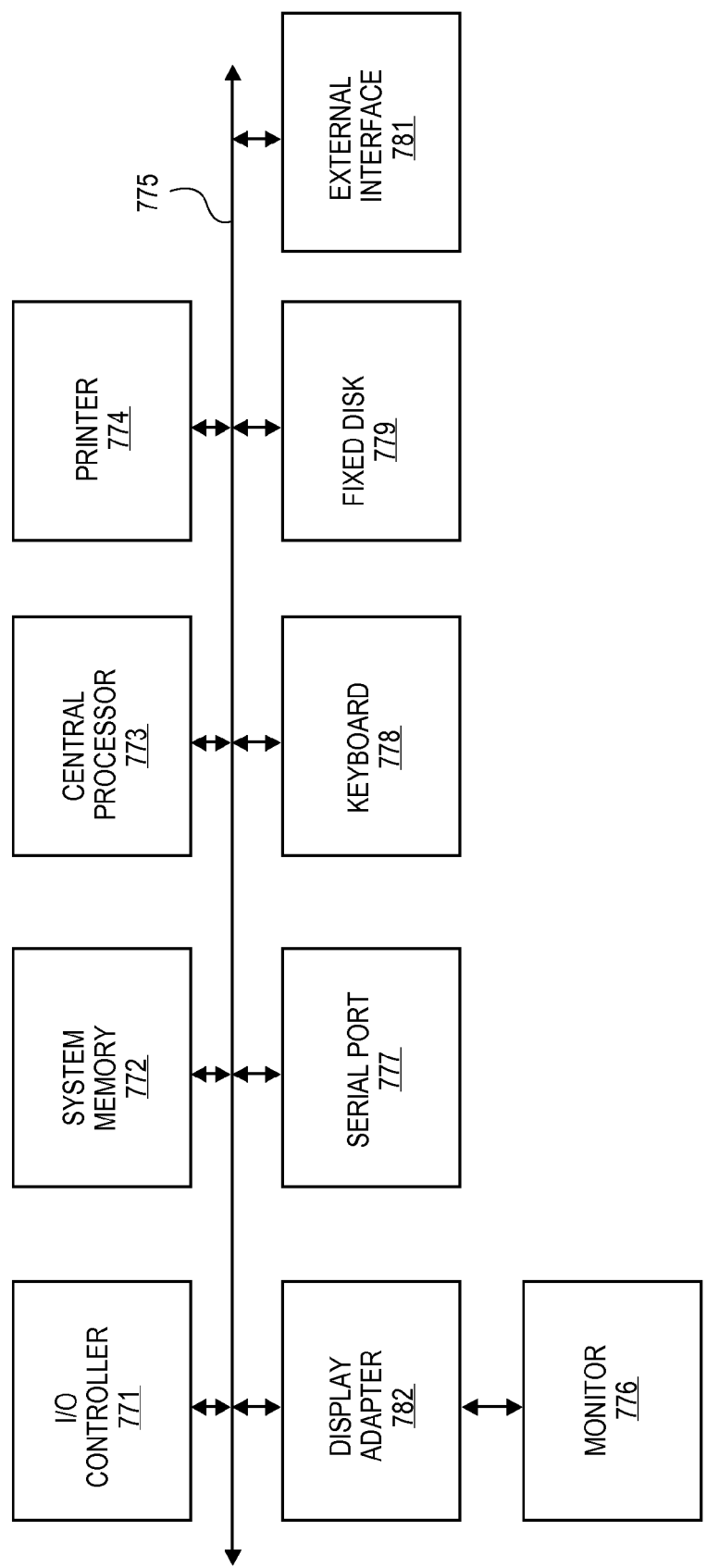

TRANSACTION USING A MOBILE DEVICE WITH AN ACCELEROMETER

CROSS-REFERENCES TO RELATED APPLICATIONS

The present application is a non-provisional application of and claims priority to U.S. Provisional Application No. 61/264,543, filed on Nov. 25, 2009, the entire contents of which are herein incorporated by reference for all purposes.

BACKGROUND

There are many situations in which a person or entity ("Payor") wishes to transfer money to another person or entity ("Payee"). In the simplest situation, the Payor physically transfers cash funds to the Payee. In other situations, the Payor transfers money to the Payee using a check. If the Payee is a merchant, the Payor may use a credit card, debit card, or other portable consumer device by presenting that card or portable consumer device to the merchant.

The process described above suffers from several shortcomings. In cases where payment is made through a written instrument such as a check, the Payee is not guaranteed that the payment instrument is valid (e.g., bounced check). In addition, even if the written instrument is valid or cash is received, the payment still must be deposited by the Payee into a checking or savings account, thus further delaying the availability of the funds in the account for further transactions. Additionally, the Payee will typically have no means for depositing funds received from a Payor directly into an account associated with a credit card, thus requiring a two step process of depositing funds into a banking account, then sending the funds to a credit card account through a means such as writing a check or an account transfer. Physical cards are subject to loss, theft, and fraudulent use.

The process further suffers from the fact that payments can typically only be made through the use of cash or a written instrument, such as a check. In many situations, the Payor may not have sufficient funds to directly pay the amount owed, but will have access to a line of credit, such as from a credit card, from which to pay. It is generally not a straightforward or inexpensive process for a Payee to establish the necessary infrastructure for receiving credit card payments directly. It makes even less sense for a Payee to spend the time and expense to establish such facilities when the number of transactions to be processed is small or possibly even a one-time transaction.

There have been attempts at solving the above mentioned problems. One example of such an attempt is the system offered by PayPal™. That system permits transactions between Payor and Payee. Payments can be sent using Payor's PayPal™ account balance, bank account, or credit card. Payments can be received by Payee only by depositing funds into Payee's PayPal account. If Payee wishes to use the funds to pay off a credit card balance, Payee must request a check or an electronic transfer to a bank account. Only then can Payee use the funds to pay his credit card bill. The funds are retrieved from the Payor's account at a banking or credit card institution, and deposited into an account at the PayPal™ system that is associated with the Payee.

Although the PayPal™ system does solve some of the problems associated with sending and receiving payment, other problems still remain. For example, in order to use the PayPal™ system, a Payee is required to register with the system. This can be a problem for any number of reasons, the simplest being that a Payee may not wish to register for privacy reasons. Additionally, a Payee may only receive funds in their PayPal™ account, and as such is tied to maintaining a financial account at the PayPal™ system. This may be undesirable for any number of reasons, an example of which could be that the PayPal™ account does not provide for an interest rate on funds held that is acceptable to the Payee. In any case, the Payee is locked into receiving his or her funds into their PayPal™ account. Furthermore, although PayPal™ does provide a feature whereby a Payee can manually initiate an electronic transfer of funds from his or her PayPal™ account to a checking or savings account, it does not provide a facility to directly transfer funds, either automatically or manually, to a credit card account. The PayPal™ system typically charges a fee to transfer funds from a credit account. The PayPal™ system further does not provide the same consumer and fraud protection protections as credit and debit cards, and the system does not provide tools for the Payee to conduct risk analysis.

With traditional credit and debit cards, there is no way to transfer funds from one card to another card. With more advanced portable consumer devices (in smart phones and personal digital assistants), there is the problem of securely connecting with, and transferring money to, the intended party. Past efforts to "beam" information from one mobile device to another mobile device pose security and privacy concerns. For example, payment account information might be accidentally sent to the wrong party. Still worse, payment account information might be captured by a fraudster trolling the airwaves for payment account information.

Various methods of connecting mobile devices have been used. For example, Bluetooth can "pair" devices together. However, setting up Bluetooth connections to "pair" devices takes time and can be inconvenient and cumbersome to the customer because a code may be required. Other forms of device-to-device communication also suffer security and privacy problems.

These and other problems are solved by the disclosure of the present invention.

BRIEF SUMMARY

Embodiments of the invention are directed to systems, apparatuses and methods for conducting a financial transaction, payment transaction, or any money transfer transaction between two devices with accelerometers that have physically interacted.

One embodiment of the invention is directed to a method of conducting a financial transaction. The method includes receiving first accelerometer data from a first device, wherein the first device comprises a first processor and a first accelerometer coupled to the first processor, receiving second accelerometer data from a second device, wherein the second device comprises a second accelerometer and a second processor coupled to the second accelerometer, receiving a payment amount from at least one of the first device or the second device, and determining when the first device moves towards the second device with a server computer using accelerometer data from the first device and the second device, and if the first and second devices moved towards each other, initiating the transmission of an authorization request message to a first issuer, wherein the first issuer approves or does not approve the authorization request message.

Another embodiment of the invention is directed to a phone comprising: a first processor, a first accelerometer coupled to the first processor, a first antenna coupled to the first processor, and a non-transitory computer readable medium coupled to the first processor. The computer readable medium includes code for implementing a method of: prompting a user of the first phone to move the first phone towards a second phone, wherein the second phone comprises a second accelerometer and a second processor coupled to the second accelerometer, generating and storing first interaction data associated with the movement of the first phone towards the second phone, sending with the first antenna, payment information to a remote server computer, and sending, with the first antenna, the first interaction data to the remote server computer for comparison against second interaction data from the second phone, wherein the first and second interaction data are used to initiate the generation of an authorization message.

Another embodiment of the invention is directed to a method of conducting a financial transaction. The method includes prompting a first user of a first device to move the first device to indicate the first user's intent to conduct a financial transaction, wherein the first device comprises a first processor and a first accelerometer coupled to the first processor, recording first movement security data representative of the first user's movement using the first accelerometer, prompting the first user to move the first device towards a second device, operated by a second user, to indicate the first user's intent to interact with the second device and conduct a financial transaction with the second user, recording first interaction data representative of the movement of the first device towards a second device using the first accelerometer, transmitting the first movement security data to a remote server computer, and transmitting the first interaction data to the remote server computer for comparison against second interaction data generated by the second device, wherein the first and second interaction data are used to conduct a financial transaction.

These and other embodiments of the invention are described in further detail below.

BRIEF DESCRIPTION OF THE DRAWINGS

The disclosure, together with further advantages thereof, may best be understood by reference to the following description taken in conjunction with the accompanying drawings in which:

FIG. 9a-c depict exemplary user interfaces according to embodiments of the present disclosure.

FIG. 11 shows a block diagram of a computer apparatus.

DETAILED DESCRIPTION

Figure 1:
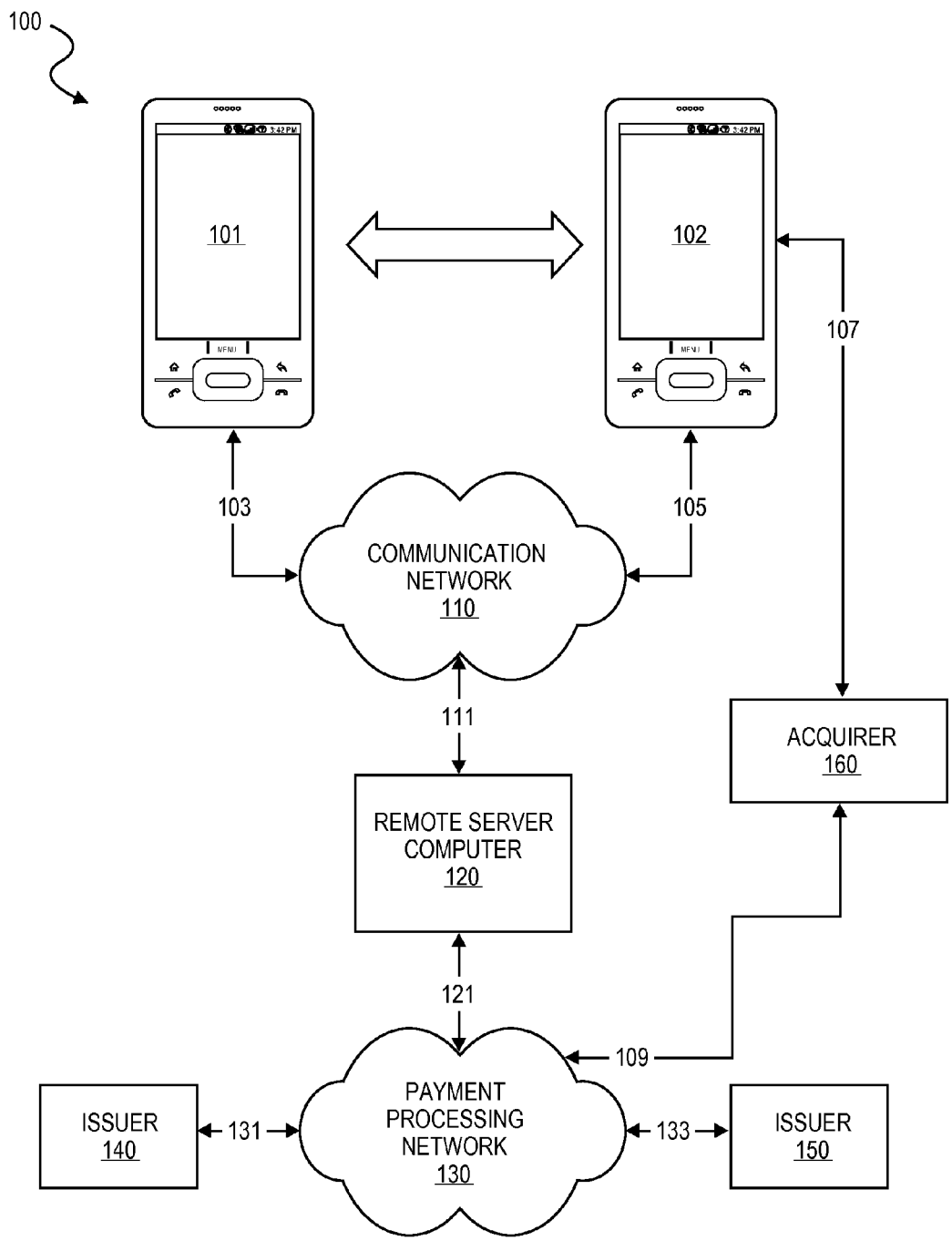
FIG. 1 is a high level diagram illustrating one embodiment of a system in accordance with the present disclosure.

Payor and Payee may wish to send and receive money in the form of a deposit to an account that has been provided by an account issuer. As used herein, Payor and Payee are used to indicate the source and destination, respectively, of the funds involved in the financial transaction. As used herein, a "deposit" may include an actual transfer of money to an account such as a debit card account, or may include a debit to an account such as a credit card account. There are many different types of accounts that can be issued, such as credit card accounts, debit card accounts, pre-paid card accounts, and gift card accounts. Generically, these accounts may be referred to as transaction accounts because they will typically provide the Payee with the ability to use the account to engage in financial transactions. This is generally accomplished through the issuance of a transaction card that is associated with the transaction account. Transaction cards can take many forms, including plastic cards with a magnetic stripe, smartcards, elements embedded in cellular phones, secure tokens, or any other suitable form. Transaction accounts need not have a transaction card associated with it, however.

In many cases, the Payor and Payee may have multiple transaction accounts that have been issued by multiple issuers. An issuer is a financial institution, generally a bank, that creates and maintains financial accounts, including transaction accounts. Unlike traditional bank accounts, such as checking and savings accounts, it is typically not possible for anyone other than the owner or authorized user of a transaction account to make deposits into the transaction account. As an example, it is typically not possible for anyone other than the owner or authorized user of a credit card to make payments to the account associated with the credit card. This may be for the simple reason that to allow a third party to make a payment to a credit card would require revealing the account information, such as the credit card number, to the third party.

Furthermore, the Payor and Payee may have multiple transaction accounts. Permitting a Payor/Payee to specify the account to send/receive funds on a per transaction basis allows the Payor/Payee to switch accounts that will send/receive funds at will. In other embodiments of the invention, the system will store the Payor and Payee's transaction account details in order to provide additional convenience to the user, as they will not have to specify the account to receive funds for each transaction.

One embodiment of the invention is directed to a method comprising moving a first device comprising a first processor and a first accelerometer coupled to the first processor towards a second device comprising a second accelerometer and a second processor coupled to the second accelerometer. A processor in a remote server computer then determines when the first device moves towards the second device. After the remote server computer determines that the first has moved towards the second device, a financial transaction is conducted between the operator of the first device with the first accelerometer and the operator of the second device with the second accelerometer.

In one embodiment, the first device may be a mobile phone associated with a transaction account. An account number associated with the transaction account may be stored in the phone or it may be linked to the phone in a database. The second device may be a second mobile phone. Although the second device can have an accelerometer, the second device could alternatively have another type of sensor such as a pressure sensor in other embodiments of the invention.

As part of a transaction, the first device may be bumped or tapped against the second device. Thus, the devices have "interacted" with each other. Alternatively, the first device may move towards a second device, interacting with it without making physical contact. In some embodiments, the second device can move toward the first device when the first device moves toward the second device, so that both of the devices move toward each other. For example, operators of devices may simulate a "high five" from across the room at the same time. The interaction data on each of the respective phones will be similar, indicating that the devices interacted, even though no physical contact was made. After the devices interact with each other by moving towards each other and/or tapping or bumping each other, a remote server computer receives accelerometer data from the first and second devices. Alternatively, a processor in the first and/or second device determines that the first device moved towards the second device.

In other embodiments, the first and second devices are shaken together in a synchronous fashion to generate first and second interaction data. If the first and second interaction data are the same or substantially, it can be determined that the two devices interacted. For example, when the first and second devices are shaken together, motion sensors (e.g., accelerometers) on the devices may generate the same or substantially equal acceleration data. The speed, direction, or orientation of the devices may also be used. If the same or substantially equal acceleration data are generated, it can be determined that the devices intentionally interacted and the device can be "paired" and/or communications may be initiated. As used herein, two devices are "paired" when a secure connection for communications has been established between the two devices. The secure connection may be through a remote server computer or via wireless RF or infrared communications.

For example, to transfer money from a first device to a second device, when a suitable application is running on a first and a second mobile device, the first and second devices may be placed in the hand of one of the operators of the first and second device. That operator may shake both of the device together, in a synchronous fashion, in his hand. During the shake movement, the respective accelerometers in each of the first and second device generate first and second interaction data that is representative of the movement. The first interaction data is sent to the remote server computer by the first device, and the second interaction data is sent to the remote server computer by the second device. The remote server determines, based on the first and second interaction data, that the devices intended to interaction and conduct a financial transaction.

As used herein, "accelerometer data" may include any suitable data that is generated by an accelerometer that is representative of a mobile device's movement. For example, accelerometer data may include a numeric value that corresponds to the magnitude and/or direction of the acceleration. In other embodiments, accelerometer data may include data representing the orientation of a mobile device at a given time. Accelerometer data may include acceleration values at one or more specific times. For example:

at Time=t, Acceleration=5 m/s/s
at Time=t+1 second, Acceleration=15 m/s/s
at Time=t+3 seconds, Acceleration=10 m/s/s A processor in the remote server computer can determine when the first device moves towards the second device in any suitable manner. In one embodiment, the remote computer uses accelerometer data from the first device and the second device to initiate communication between two devices by pairing the first and second devices together based on the characteristics of the accelerometer data sent from the first and second devices. After communications between the two devices are initiated, a financial transaction between the users of the first and second devices continues. Specifically, an authorization request message is generated and is sent to an issuer for approval, and a response is generated.

In one embodiment, suitable applications running on the first device and the second device can be active and a processor (in the remote server computer, the first device and/or the second device) can determine when the first and second devices move using accelerometer data from the first accelerometer in the first device and the second accelerometer in the second device. A first accelerometer in the first device measures the acceleration of the first device and stores the first acceleration data in a first memory in the first device. A second accelerometer in the second device measures the acceleration of the second device and stores the second acceleration data in a second memory in the second device. Accelerometers may detect motion and may measure the magnitude and direction of the acceleration. Accelerometers may also sense orientation. One of skill in the art will appreciate that other motion sensors or orientation sensors may be used instead of, or in conjunction with, accelerometers.

The first and second devices transmit first and second accelerometer data, respectively, to a remote server computer via a communications network. The communications network may be a suitable data network and is preferably a wireless network, such as a WiFi network or a cellular network. (Edge, 3G, 4G, etc.)

The remote server computer is in operative communication with the communications network. The remote server computer receives first accelerometer data from the first device and receives second accelerometer data from the second device. The remote server computer may also receive other interaction data representing characteristics of the interaction from the first and second devices. For example, timestamps may be used to record when a device movement starts and when a device movement ends. The duration of the movement and other time data may also be recorded by the device and sent to the remote server computer. Location indicators from the first and second devices may also be recorded and sent to the remote server computer. One example of location indicators are latitude and longitude coordinates generated by GPS units residing in the first and second devices. Cellular tower triangulation may also be used.

In some embodiments, the remote server computer also receives device identification information. For example, a mobile phone might be identified by its phone number, SIM card numbers, serial number, hardware ID, IP address, etc. Device identification information may be used by the processor to specifically identify the first and second devices so that the remote server computer knows how to process information (e.g., transfer data) with respect to the first and second devices. Any suitable unique device identifier can be used by the remote server computer to differentiate the source of the data.

After the first and second devices interact with each other, the remote server computer receives a payment amount from at least one of the first device or the second device. The payment amount may be entered by an operator of the device (Payor or Payee) using the user interface of a suitable application running on the device. The payment amount may be provided by the Payor, and the Payor may send the payment amount to the remote server computer. In another embodiment, the Payee may provide the payment amount, and the Payee may send the payment amount to the remote server computer. Regardless of whether the Payor or the Payee initially provides the payment amount, the other party may verify the payment amount and send the payment account to the remote server computer or back to the other party. For example, Payee could provide the payment amount and send the payment amount directly to Payor. Then, after Payor confirms the amount, Payor can send the confirmed payment amount to the remote server computer. In some embodiments, the payment amount is determined using location data (e.g., at a location, such as a movie theatre, where the price is the same for all patrons). Many other variations are possible.

After the remote server computer receives at least the first and second accelerometer data, the remote server computer determines whether the first device moved toward the second device. The remote server computer uses a pairing algorithm to analyze accelerometer data and pair similar accelerometer data. The pairing algorithm takes accelerometer data as input and may also take interaction data representative of a device's movement as input. The remote server computer analyzes the data representative of the movement of the first and second devices to determine if, and when, the first device moves towards the second device. For example, if acceleration and time data from the first and second devices indicates that the first and second devices were accelerated above a predetermined threshold within a short period of time (e.g., less than 5 seconds or 1 second), then the processor can conclude that the first and second devices have interacted with each other. The remote server computer may store the data representative of the movement into a log file for later verification that the movement of the first and/or second devices occurred.

If the first and second devices moved towards each other, the remote server computer facilitates a financial transaction conducted between a first operator of the first device and a second operator of the second device. In some embodiments, the first operator could be an individual while the second operator could be a merchant. In other embodiments, the first operator could be an individual while the second operator could be another individual (e.g., person-to-person money transfer).

The remote server computer initiates the transmission of an authorization request message to an issuer. The authorization request message may be generated by the remote server computer and sent to a payment processing network. In other embodiments, the authorization request message may be generated by the payment processing network itself based on information provided by the remote server computer.

The payment processing network forwards the authorization request message to an issuer of the account of the Payor. Then the issuer determines whether or not to approve or deny the authorization request message. After approving or not approving the authorization request message, the issuer sends an authorization response message to the payment processing network.

Another embodiment of the invention relates to a method of verifying a financial transaction using a first device with a first accelerometer coupled to a first processor. When a suitable application is running on a first device, the user interface of the application may prompt a first user of a first device to move the first device to indicate the first user's intent to conduct a financial transaction. For example, the prompt may instruct the first user to "shake" the first device for at least 1 second or until the first device emits a noise (e.g., a ring or bell) indicating a sufficiently long shake. The processor records first movement security data representative of the first user's movement (e.g., representative of the user's shake) using the first accelerometer. Any length of time that allows the accelerometer to capture meaningful acceleration data is sufficient. The processor may store the first movement security data in a log file in the first device.

As used herein, "movement security data" may include any suitable data generated by an accelerometer or other motion sensor in response to a movement of a mobile device that is used for security. For example, in a payment transaction, movement security data, such as a motion password, can be used for authenticating user and thereafter authorizing a transaction. In some embodiments, movement security data" may be also refer to sensor data that is used to encrypt payload data between two end points or devices. Examples of movement security data may include a specific, pre-defined motion password, a random number generated by a user's movement, a pre-defined sequence of motions dictated by a computer as part of a challenge response, and the like.

The user interface of the application may prompt the first user to move the first device towards a second device, operated by a second user, to indicate the first user's intent to interact with the second device and conduct a financial transaction with the second user. For example, the user interface may instruct the first user to "bump" or "tap" the device that the first user desires to conduct a financial transaction with. The first device records first interaction data representative of the movement of the first device towards a second device using the first accelerometer. The second device may record second interaction data representative of the movement of the second device towards the first device using the second accelerometer.

First movement security data is different from first interaction data. First movement security data represents independent movement of a device. First interaction data represents data used to pair two devices that have moved or bumped together.

First movement security data may be generated randomly by the first user in some embodiments. In other embodiments, the user may move the device in a pre-determined fashion. The predetermined movement may be set up in advance of the transaction. For example, the movement security data may be a "digital signature" or "motion password" that the user set up prior to engaging in a financial transaction. Alternatively, the user interface may instruct the user to move the device in a certain way. For example, the user interface may prompt the user to move the device (e.g., up-right-down, then shake) to confirm the user's intent to conduct a financial transaction. The prompted sequence of movements may change for each attempted financial transaction (e.g., the next transaction prompt may be shake the device, then move device to the left).

The first movement security data is transmitted to a remote server computer. First movement security data has numerous useful applications. For example, first movement security data, such as shake acceleration data, may be used for a number of purposes. Shake acceleration data can be used for non-repudiation of a transaction, a unique value that that is linked to a transaction, or encryption of data. Shake acceleration data is beneficial for these purposes because it may be very hard, if not impossible to recreate. When acceleration data is combined with time data, first movement security data may be impossible to recreate.

For non-repudiation, first movement security data stored on the remote server computer can be compared to first movement security data stored on the first device to confirm that the device was used in a given transaction at a specific time and location with a unique shake value. For encryption, first movement security data may be used as a seed for encryption. A seed may be the starting value used by a random number generator to create random numbers, which may be used in encryption. Random numbers are used frequently with encryption, for example, in the generation of keys. First movement security data may be used as part of an authorization request message. For unique transaction values, first movement security data of a first device and first movement security data of a second device may be combined to create a unique transaction key. The unique transaction key may be used to encrypt communication between the first device, second device, and/or remote server computer.

The first interaction data can be transmitted to the remote server computer for comparison against second interaction data. The second interaction data can be generated by the second device. In one embodiment, the second device comprises a second accelerometer coupled to a second processor. In other embodiments, the second device comprises a motion sensor or a pressure sensor. The remote server computer analyzes the first and second interaction data to determine that the users of the devices intended to conduct a financial transaction.

In another embodiment, a first device and a second device are moved together to generate first and second interaction data respectively. A remote server computer determines that the two devices have interacted using a pairing algorithm. Then, a payment amount is entered into the first and/or second device. After a payment amount has been entered, the user interface on the phone prompts one or both users to shake the phone to generate movement security data.

Additional details regarding embodiments of the invention are described below.

I. Exemplary System

FIG. 1 is a high level diagram illustrating one embodiment of a system 100 capable of performing the disclosed method. The system 100 includes a Payor device 101, a Payee device 102, a communications network 110, a remote server computer 120, a payment processing network 130, account issuers 140 and 150, and an acquirer 160. "Payor" and "Payee" are used here to depict the party that is making a payment and the party that is receiving a payment, respectively. Devices 101 and 102 may be used to make and receive payments and may be linked to the transaction account. That is, Payor device 101 can also be used to receive a payment, and Payee device 102 can be used to make a payment. The components illustrated in FIG. 1 and recited above can be in operative communication with each other via communication channels, depicted as arrows 103, 105, 107, 109, 111, 121, 131, and 133.

According to embodiments of the system, devices 101 and 102 can be in any suitable form. Devices 101 and 102 are linked to transaction accounts and may contain a computer readable medium. The computer readable medium may embody a program containing code to perform embodiments of the invention. Any device that is capable of sensing motion and sending/receiving information to communications network 110 and linked to a transaction account would be suitable.

After moving the first device towards the second device, the second device is "bumped." The processors and the accelerometers in the first and second devices can provide acceleration data, time data (e.g., timestamps), and/or geo-location data (e.g., GPS coordinates) to a remote server computer indicating that they have been intentionally moved and that operators of those devices intend for those devices to interact with each other. Collectively, this data is referred to as "interaction data."

Interaction data is data representing the characteristics of an interaction, or attempted interaction, between devices. Interaction data includes accelerometer data. Accelerometer data may include numeric values representing the magnitude and direction of the acceleration as a vector quantity. Interaction data further may include the duration of time period (e.g., the length of time a device was still or near motionless or the length of time a device was continuously moving.) Interaction data may further include the geographic location of the device at the time of an interaction or attempted interaction.

In embodiments of the invention, an accelerometer is used to measure the acceleration that devices 101 and 102 experience relative to freefall. Single- and multi-axis models can detect the magnitude and direction of the acceleration as a vector quantity. Accelerometers can also be used to sense orientation, vibration and shock. Exemplary devices could be smart phones, Personal Digital Assistants (PDA), tablet computers, and the like. Micro-machined accelerometers are increasingly present in portable electronic devices and video game controllers. Thus, portable devices with accelerometers and processors are commercially available.

An application runs on the devices 101 and 102. For example, the application or program may be an application downloaded from an application store, music store, or an online marketplace. When the application is started, it may connect to the remote server computer 120. In another embodiment, the connection to the remote server computer 120 may occur only when the application needs to communicate with the server computer. Software on the mobile device may store other interaction data and other sensor data. The interaction data may be sent by the mobile devices to the remote server computer 120 via 103 and 105.

Devices 101 and 102 communicate with remote server computer 120 through communications network 110. Devices 101 and 102 may also communicate with payment processing network 130 via communications network 110. When the first mobile device and the second mobile device communicate with the remote server computer 120, encryption may be used to securely transmit the data. Accelerometer data or other interaction data may be used as a seed for the encryption algorithm.

In one embodiment, a device is shaken to generate random data using accelerometer data. The random data generated by the accelerometer is stored to the device and is sent to a remote server computer. Thereafter, the random data can be used as a key in an end-to-end encryption scheme.

The devices may communicate with the remote server computer 120 and/or payment processing network 130 through any suitable communications channel (e.g., 103, 105, 111, and 121). One exemplary communications network 110 would be communications through the Internet. Other examples of a communications channel could include wired and wireless networks (e.g., WiFi) or local and wide area networks. Communication networks 110 may be a cellular data network (e.g., Edge, 3G, 4G, etc.). Devices 101 and 102 can send and receive messages and data through communication channels 103 and 105 to communications network 110.

Remote server computer 120 is in operative communication with communications network 110 via communication channel 111. Remote server computer 120 uses the accelerometer data and other interaction data as input to a pairing algorithm designed to match interaction of different devices. Remote server computer 120 receives and monitors accelerometer data from devices 101 and 102. After remote server computer 120 receives accelerometer data and other interaction data, a pairing algorithm attempts to match the data from two interaction attempts by different devices. An interaction attempt is a movement of a device above a predetermined threshold of movement (or acceleration) made by the operator of the device to start communications with another device.

The pairing algorithm allows the remote server computer 120 to match interaction data between any two devices in the world that tap, bump, or otherwise interact with each other. The pairing algorithm takes numerous input (accelerometer data, time data, location information, and other data representative of the interaction event) from devices 101 and 102.

For example, to limit the number of potential matches, the pairing algorithm may examine location data first. In another embodiment, the algorithm may examine timestamp data first. In yet another embodiment, the algorithm may examine accelerometer measurements first. In still other embodiments, the interaction data from the mobile device may be examined substantially at the same time and the different type of interaction data may be assigned a differing weight. Location information and/or timestamp data may be more conclusive in determining whether two mobile devices were bumped together than accelerometer measurements. In this case, the location information and/or timestamp data may be given more precedence in the pairing algorithm.

When the remote server computer determines that two devices have interacted, the remote server computer may "connect" the two mobile devices so that they can directly communicate with each other. That is, when the remote server computer 120 determines that devices 101 and 102 have interacted with each other, the server computer 120 may "pair" the two devices. At this point, remote server computer 120 acts as a conduit (via 103, 105, and 111) for communication between the two mobile devices. Communication sent through communication channels 103, 105, and 111 may be encrypted or otherwise secured. Alternatively, devices 101 and 102 may connect directly and may use a session key communicated by the server computer.

When the remote server computer 120 determines that devices 101 and 102 have interacted with each other and when the operators of the devices wish to conduct a financial transaction, in some embodiments, the remote server computer 120 may send an authorization request message to the payment processing network 130 via communication channel 121. In other embodiments, the server computer may initiate the authorization request message by transmitting the payment information to the payment processing network 130, which then generates the authorization request message.

In some embodiments, Payor specifies the transaction account from which funds should be withdrawn. Then, Payor may send this information to the payment processing network 130 via communication channel 103 and remote server computer 120. The payment processing network 130 may then receive the account information provided by the Payor, and determine the issuer that issued the transaction account. In one embodiment, the issuer can be determined based on the account number.

The payment processing network 130 may then request a transfer of funds from the issuer 140 that has issued the Payor's transaction account. After verifying that the account is valid, and that sufficient funds or credit exists to make the payment, the issuer 140 may respond (131) to the payment processing network 130 indicating that the transaction may proceed. Upon receipt of the message indicting that the transaction may proceed (131), the payment processing network 130 may receive funds from the Payor's transaction account. In one embodiment, the received funds may be temporarily stored in a generic holding account at the payment processing network 130 prior to being transferred to the issuer of the Payee's account. In another embodiment, the funds may be temporarily stored in a holding account that is associated with the issuer of the Payee's account, but not specifically associated with the Payee's account.

The payment processing network 130 may then push the funds received from the Payor's transaction account into the account specified by the Payee. The payment processing network may send a message to the issuer 150 of the account specified by the Payee requesting that the funds received be transferred from the account in which they are being held temporarily, into the account that the Payee has specified. Again, the payment processing network 130 is capable of this transaction because it contains payment authorization, clearing, and settlement services. After the funds have been deposited into the account specified by the Payee, the Issuer 150 may send a response message 133 to the payment processing network 130 indicating the successful transaction.

Upon receipt of the message indicating a successful transaction, the payment processing network 130 may send a message 132 to the Payee indicating that the funds have been received and deposited into the specified account. At this point funds have been effectively transferred from the Payor device 101 to the Payee device 102. The payment processing network 130 is capable of requesting funds directly from the issuer because, as mentioned above, it contains payment authorization, clearing, and settlement services.

In embodiments of the present invention, funds may be deposited directly from one account to another account without requiring intermediate transfers initiated by the user. For example, funds may be deposited into a credit account from another credit account without requiring intermediate transfers initiated by the user. In other embodiments. Numerous variation are possible (credit to debit, debit to credit, debit to debit, etc.). In these scenarios and others, the funds may be transferred without requiring an intermediate transfers of funds from a third party account that must be initiated by the user.

In one embodiment, the authorization request message is sent to the issuer 140 of the transaction account associated with device 101. After the issuer 140 receives the authorization request message, the issuer 140 sends an authorization response message back to the payment processing network 130 to indicate whether or not the current transaction is authorized. The payment processing network 130 then forwards the authorization response message back to device 102.

Issuer 140 holding the Payor's transaction account may receive the request for the transfer of funds from the Payor's transaction account. After verifying that the account is valid, and that sufficient funds or credit exists to make the payment, issuer 140 may respond (131) to the payment processing network 130 indicating that the transaction may proceed.

In some embodiments, the device 102 may be operated by a merchant, and the merchant may have an acquiring bank. In this embodiment, the authorization request message may be sent to the payment processing network 130 by the acquirer 160. Acquirer 160 forwards the authorization request to the payment processing network 130 via 109. The authorization request message is then forwarded by the payment processing network 130 to the issuer 140 of the transaction account associated with device 101. After the issuer 140 receives the authorization request message, issuer 140 may then authorize or decline the transaction. The transaction may be approved or declined due to a number of factors (e.g., the creditworthiness of the consumer, the risk of fraud, etc). The issuer 140 generates an authorization response message, indicating whether or not the current transaction is authorized, and sends this back to the payment processing network 130.

After device 102 receives the authorization response message (via acquirer 160), device 102 may then provide the authorization response message for the Payor. The response message may be displayed by device 101 (Payor) or 102 (Payee). In some embodiments, a transaction receipt may be sent to at least one of the first or second device. The transaction receipt may be sent via email, test message, or an application alert.

At the end of the day, a normal clearing and settlement process can be conducted by the payment processing network 130. A clearing process is a process of exchanging financial details between an acquirer and an issuer to facilitate posting to a consumer's account and reconciliation of the consumer's settlement position. Clearing and settlement can occur simultaneously.

A payment authorization request message may include a Payor personal account number (PAN), risk score, fraud protection data, Payee PAN, transaction ID, transaction details, and Payor and Payee information. Payor PAN includes account number information of the Payor. The payment authorization request message may also include risk score, indicating the credit risk of the Payor. Risk score may be based on interaction data, such as location data. Risk score may be used by the receiving financial institution to make a determination of whether to accept or deny the transaction.

Transaction details may include transaction amount, merchant category code, service code, or other information. Transaction details may also be used to calculate a risk score. The authorization request message may also include additional information such as the card verification value or expiration date. Transaction details may further include information about the funds transfer such as amount of funds transfer, currency, exchange rate, etc. Even though the payment authorization message is described as including certain information, one skilled in the art will realize that other types of information in lieu of or in addition to the information described may be included in the authorization request message.

The payment processing network 130 may include data processing subsystems, networks, and operations used to support and deliver authorization services, exception file services, and clearing and settlement services. An exemplary payment processing system may include VisaNet™. Payment processing systems such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 130 may include a server computer. A server computer is typically a powerful computer or cluster of computers. For example, the server computer can be a large mainframe, a minicomputer cluster, or a group of server computers functioning as a unit. In one example, the server computer may be a database server computer coupled to a Web server computer. The payment processing network 130 may use any suitable wired or wireless network, including the Internet.

The account issuers 140 and 150 may be any type of financial institutions, such as banks, that issue transaction accounts. Such transaction accounts can include credit accounts, debit accounts, and banking accounts, such as checking and savings accounts. An account issued by an account issuer 140 and 150 may optionally be associated with a transaction card (not shown) that is issued to the users of the transaction account. Transaction cards may be credit cards, debit cards, or any other type of payment card. However, a physical transaction card is not necessary in embodiments of this system because transaction accounts may be linked to devices 101 and 102. Devices 101 and 102 are linked to transaction accounts (not shown) that are issued by issuers 140 and 150, respectively.

Although only a single issuer is shown for each device 101 and 102, it would be clear to a person of skill in the art that devices 101 and 102 each could be associated with any number of transaction accounts that are issued by any number of issuers. For example, device 101 may be associated with a credit card account maintained by one issuer and a debit card account maintained by a different issuer. This would allow a user to choose which transaction account to use in the transaction. Therefore, a user could make all payments with a credit account and receive all payments directly into a checking account. Likewise, device 102 may be linked to multiple transaction accounts from multiple issuers. In some embodiments, the devices 101 and 102 may both be associated with transaction accounts issued by the same issuer.

Figure 2:
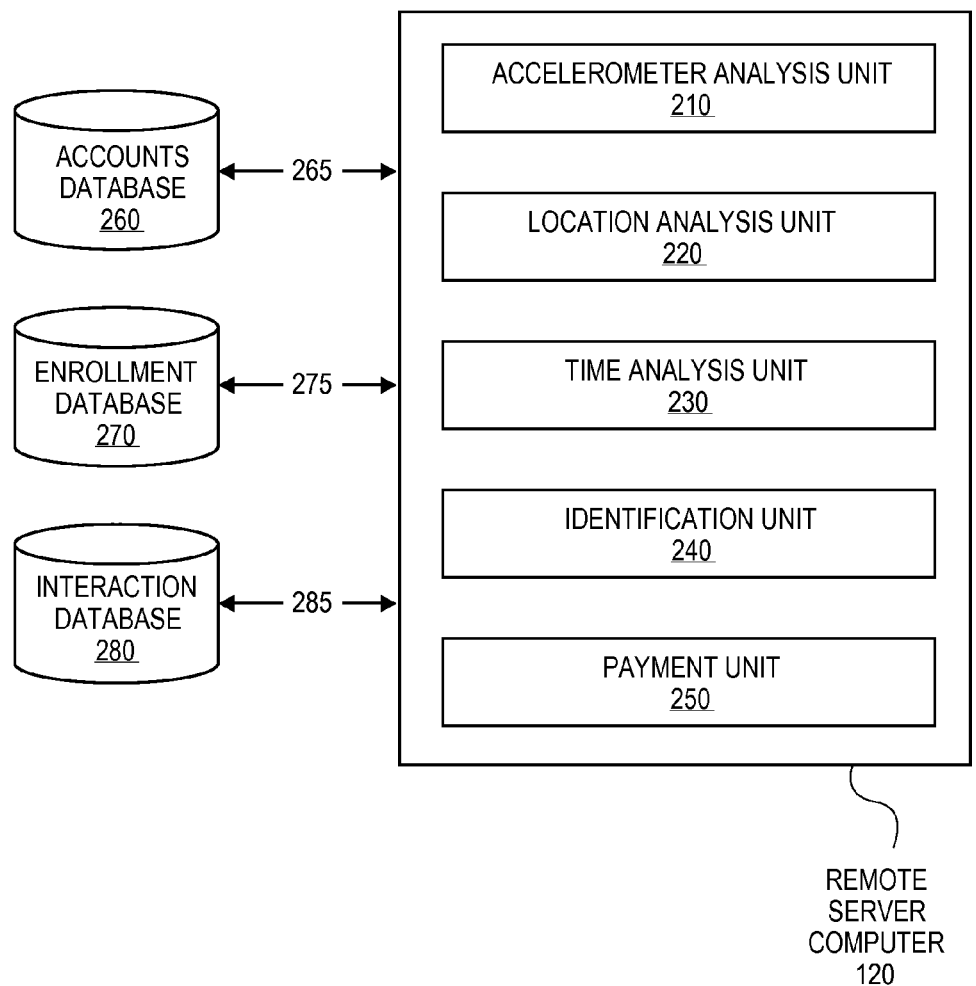
FIG. 2 is a high level diagram illustrating one embodiment of a remote server computer in accordance with the present disclosure.

FIG. 2 depicts an embodiment of the remote server computer 120 which may be in operative communication with the communications network (not shown) and payment processing network (not shown). Remote server computer 120 may include an accelerometer analysis unit 210, location analysis unit 220, time analysis unit 230, identification unit 240, and payment unit 250, which may be used alone or in combination to resolve or "match" devices that have interacted with each other (e.g., made intentional physical contact). Units within the server computer are coupled to a processor. Various databases (e.g., 260, 270, and 280) may be associated with the remote server computer 120 and/or in operative communication through communication channels 265, 275, and 285, which may be wired or wireless connections. In some embodiments, databases 260, 270, and 280 are part of the remote server computer.

Accelerometer analysis unit 210 compares accelerometer data from a plurality of devices. Accelerometer data may include the magnitude and direction of the acceleration. Accelerometer data may also include orientation data (such as pitch, yaw, and roll and/or cardinal direction of the device). From the accelerometer data, the accelerometer analysis unit 210 can determine whether two devices intentionally have interacted with each other. For example, if the absolute value of the magnitude of the measured acceleration of two devices is equal, or substantially equal, the accelerometer analysis unit 210 can determine with relative certainty that the two devices have interacted together. In embodiments where magnitude and direction of the acceleration are analyzed by the accelerometer analysis unit 210, it would be expected that devices that are "bumped" together would have substantially equal acceleration magnitude in opposite directions. That is, accelerometer analysis unit 210 can determine with relative certainty that the two devices were "bumped" together if the accelerometer data of two devices was substantially equal and opposite.

Location analysis unit 220 may be used to help further resolve conflicts from interaction data generated by devices 101, 102. The location analysis unit compares location data from a plurality of devices and determines whether any two devices are sufficiently close when acceleration (above a predetermined threshold) occurred to indicate a likelihood that two devices have interacted with each other. Location data is obtained through GPS units residing devices (e.g., 101, 102). Cellular tower data may also be used to determine the location of a device. As discussed above, interaction data from numerous devices is sent to the remote server computer for comparison and analysis. Location data may be used to supplement accelerometer data in order to determine whether two devices have interacted. For example, if two devices with substantially similar acceleration data were also within 100 feet of each other according to location data, there is a high probability that the devices have intentionally interacted with each other.

Time analysis unit 230 may be used to help further resolve conflicts from interaction data generated by devices 101, 102. The time analysis unit compares time data from a plurality of devices and determines whether any two devices accelerated at the same, or substantially the same, time. Time data is obtained from devices. Time data may include a timestamp indicating when acceleration (above a predetermined threshold) started or stopped as well as the duration of the device's movement. For example, the server computer may determine with greater certainty that devices with similar acceleration data have interacted with each other if the time data from the respective devices is also similar (e.g., acceleration within 5 seconds after adjustments for differences in clocks and time zones).

Identification unit 240 may be used to identify the device or payment associated with any given interaction data. A device may be identified by its phone number, SIM card numbers, serial number, or hardware ID. Identification unit 240 may look up enrollment information or account information associated with a device by querying accounts database 260 or enrollment database 270.

In some embodiments, users of a device according to the present invention must register their devices in order to make or receive payment. Enrollment information for a plurality of users is stored in the enrollment database 270. Enrollment information may include information about the enrolled device (e.g., phone number, SIM card numbers, serial number, or hardware ID) and information about the enrolled customer (e.g., name, financial account associated with customer, etc.). Accounts database 260 may store transaction account information. Transaction account information includes payment account information from at least one issuer.

Payment unit 250 aggregates and formats payment information (e.g., Payor, Payee, payment amount, etc.) after remote server computer 120 has determined that two devices have interacted and the users of those devices intend to conduct a financial transaction. In some embodiments, payment unit 250 aggregates Payor information, Payee information, and a payment amount. Payment unit 250 may create an authorization request message using this information. In other embodiments, payment unit 250 forwards payment information to a payment processing network, thereby initiating an authorization request message.

Figure 3A:
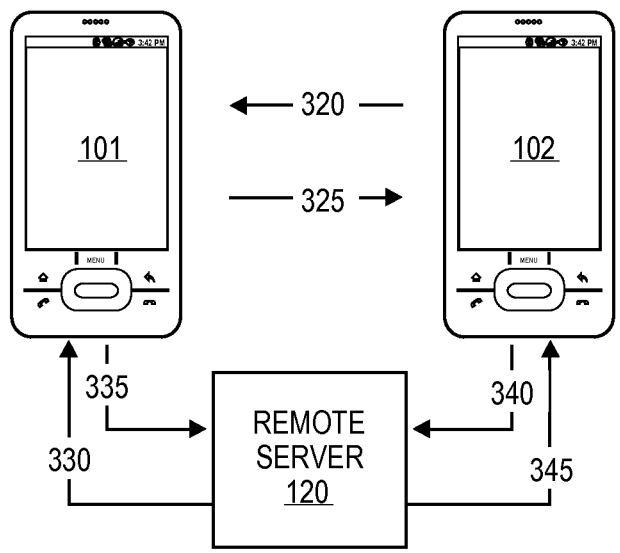
FIGS. 3a-c are a high level diagrams illustrating various embodiments of a communication between devices and a remote server computer in accordance with the present disclosure.
Figure 3B:
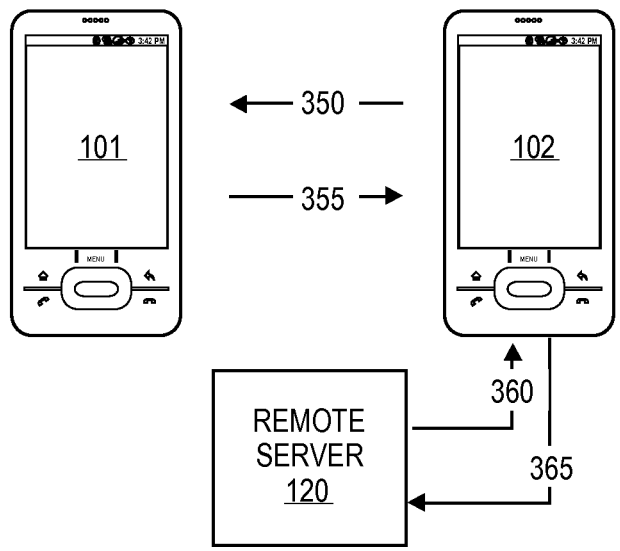
Figure 3C:
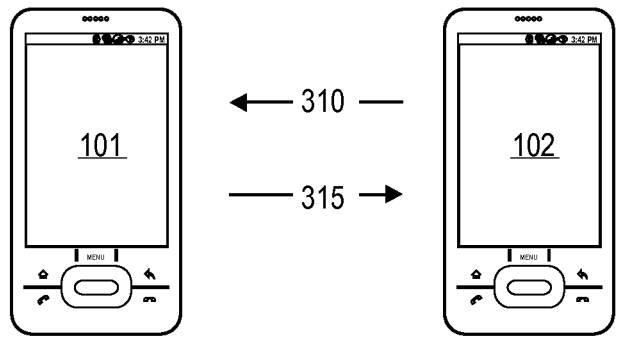

In FIG. 1, device 101 and device 102 do not directly communicate with each other, but communicate with each other via a central server computer. FIGS. 3*a-c* show various embodiments of the communication flows contemplated by embodiments of the present invention. Although illustrated as mobile phones, in FIGS. 3*a-c*, devices 101, 102 can be any type of mobile device with an accelerometer. Communications network 110, depicted in FIG. 1, is not shown for the purposes of this illustration. However, one of skill in the art would understand that the devices 101, 102 communicate with remote server computer 120 via a communications network.

FIG. 3*a* shows a system whereby a remote server computer 120 provides both devices 101 and 102 with session keys, and devices 101 and 102 can communicate directly with each other as long as the session keys are active. Session keys may be based, in part, on the accelerometer data from one or both of the devices 101 and 102. In this embodiment, launch of applications on devices 101 and 102 may automatically initiate a request for the session keys. Devices 101 and 102 may "bump" and communicate with each other. This causes first interaction data to be sent from device 101 to remote server computer 120 via connection 335 and second interaction data to be sent from device 102 to remote server computer 120 via connection 340. Remote server computer 120 determines based on interaction data that the operators of the two devices want to exchange information. Session keys may be sent by remote server computer 120 to devices 101, 102 via connections 330, 345. While session keys are active, devices 101 and 102 may directly exchange information, such as financial account information or payment amount, through wireless links 320 and 325 (e.g., RF and/or infrared).

FIG. 3*b* shows a system including two devices 101 and 102 that communicate through wireless links 350 and 355 and one of device 101 and device 102 that communicates with a remote server computer 120 via connections 360 and 365. In this embodiment, device 101 could communicate with the remote server computer 120 through device 102. Accelerometer data, time-stamp data, etc. can be sent from device 101 to the remote server computer 120 via device 102. The processor in device 102 can send any suitable interaction data to the remote server computer 120 after devices 101 and 102 have interacted with each other.

In another embodiment, the server computer can receive both the account number from the first device and a transaction amount from the second device along with the accelerometer data, timestamp, and/or geo-location data from both the first and second devices. The remote server computer could then initiate, format, and send an authorization request message to the issuer, and the issuer can approve or deny the request (as described above). An authorization response message may then be sent by the issuer to the first and/or second devices.

In one embodiment, after the server computer determines that the first device and the second device have interacted with each other, the server computer can send the payment account number to the second device for payment processing. The account number may have been sent by the first device to the server computer after the first and second devices "bumped," or the remote server computer may have retrieved the account number from a database after determining that the first and second devices bumped. After the second device receives the account number, the second device may then format an authorization request message comprising the transaction amount and a merchant code, and this may be sent to the issuer (via an acquirer and a payment processing network) of the account number for approval. After the issuer approves of the transaction, an authorization response message indicating approval of the transaction (or denial) may be sent to the first device or the second device. At the end of the day, a clearing and settling process between the issuer, acquirer, and payment processing network can occur.

FIG. 3*c* shows a system including device 101 and device 102 communicating with each other without the use of an intermediate remote server computer 120. In this embodiment, the two devices 101 and 102 may communicate with each other through wireless links 310 and 315 (e.g., RF and/or infrared) after a session key is issued.

Embodiments of the invention can be implemented in different ways. Also, in embodiments of the invention, it is possible to send information from a remote server computer to the first and second devices before they interact with each other or "bump" into each other. It is also possible to send information (e.g., coupons, receipts) to the first and second devices after they interact with each other or "bump" each other.

II. Exemplary Methods

Figure 4:
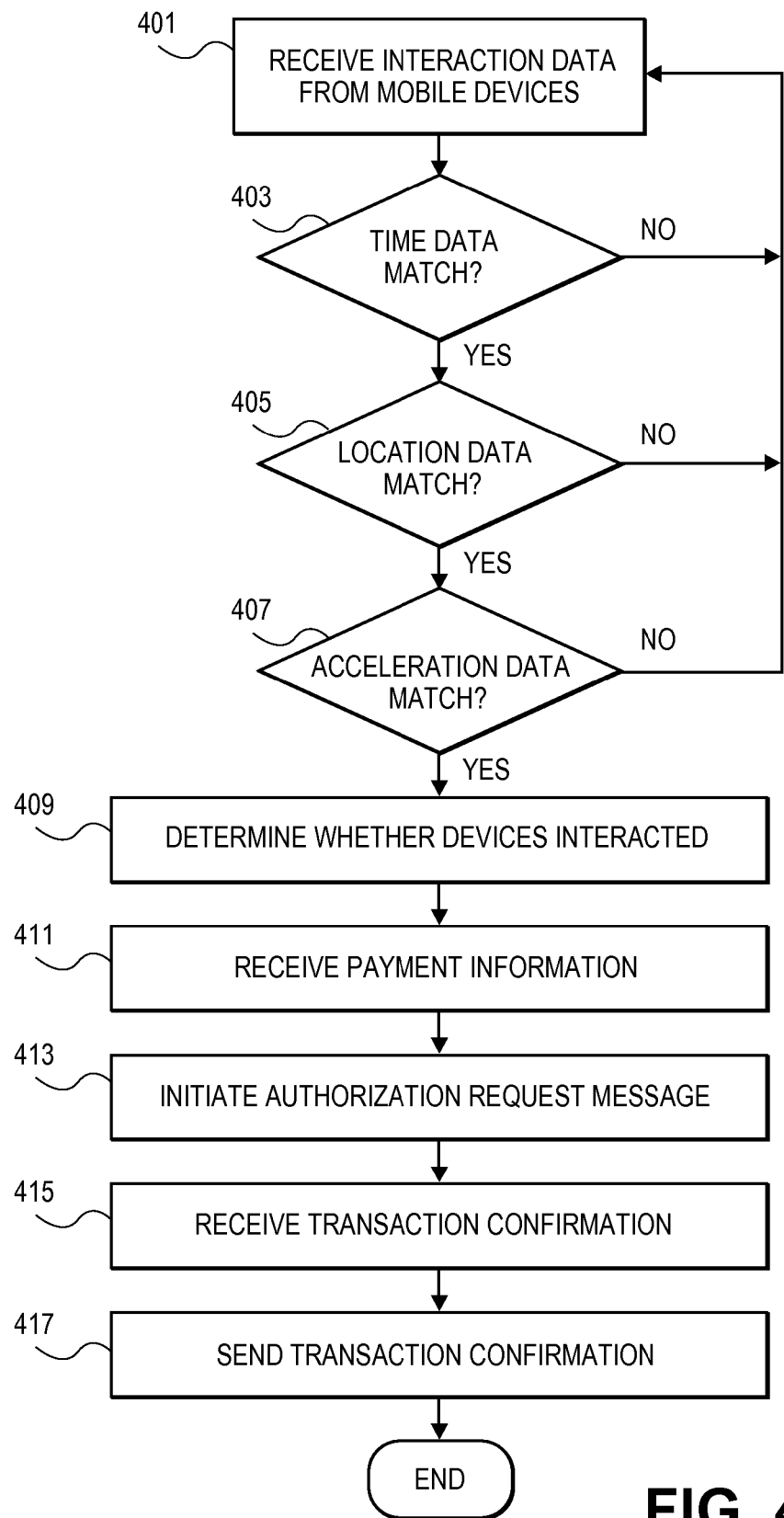
FIG. 4 is a high level flow diagram illustrating one embodiment of a method of processing a transaction in accordance with the present invention.

FIG. 4 is a high level flow diagram illustrating one embodiment of a method of resolving interaction data from a plurality of devices and conducting a financial transaction between two devices that have interacted. The method in FIG. 4 can be described with reference to FIGS. 1 and 2. In step 401, remote server computer 120 receives accelerometer, location, and/or time data from mobile devices 101, 102 (in FIG. 1). In step 403, time analysis unit 230 (in FIG. 2) compares the time data from device 101 with time data from device 102. If the time data matches, or is substantially the same, the location analyzer unit 220 compares the location data from device 101 with location data from device 102 (step 405). If the time data does not match, remote server computer 120 returns to state 401 and monitors and receives accelerometer, location, and time data from mobile devices.

If the location data matches, or the information indicates that the devices are substantially close, the accelerometer analysis unit compares the accelerometer data from device 101 with accelerometer data from device 102 (step 407). If the location data does not match, remote server computer 120 returns to state 401 and monitors and receives accelerometer, location, and time data from mobile devices.

If the accelerometer data matches, or is substantially similar, remote server computer 120 can determine with sufficient certainly that the devices 101, 102 intended to interact (step 409). If the accelerometer data does not match, remote server computer 120 returns to state 401 and monitors and receives accelerometer, location, and time data from mobile devices. The receipt and analysis of data illustrated in steps 401, 403, 405, and 407 may be completed in any suitable order or may occur simultaneously. For example, analysis of the accelerometer data (step 407) may be completed before analysis of time data (step 403).

In step 411, remote server computer 120 receives payment amount, Payor information, and Payee information. In some embodiments, step 411 can occur before a determination is made that two devices have interacted (e.g., step 411 may occur before step 409 or 401). In step 413, remote server computer 120 initiates an authorization request message. In step 415, remote server computer 120 receives a confirmation from the payments processing network. In step 417, remote server computer 120 sends a confirmation to at least one of the mobile devices. Other specific details of this method are described above.

Figure 5:
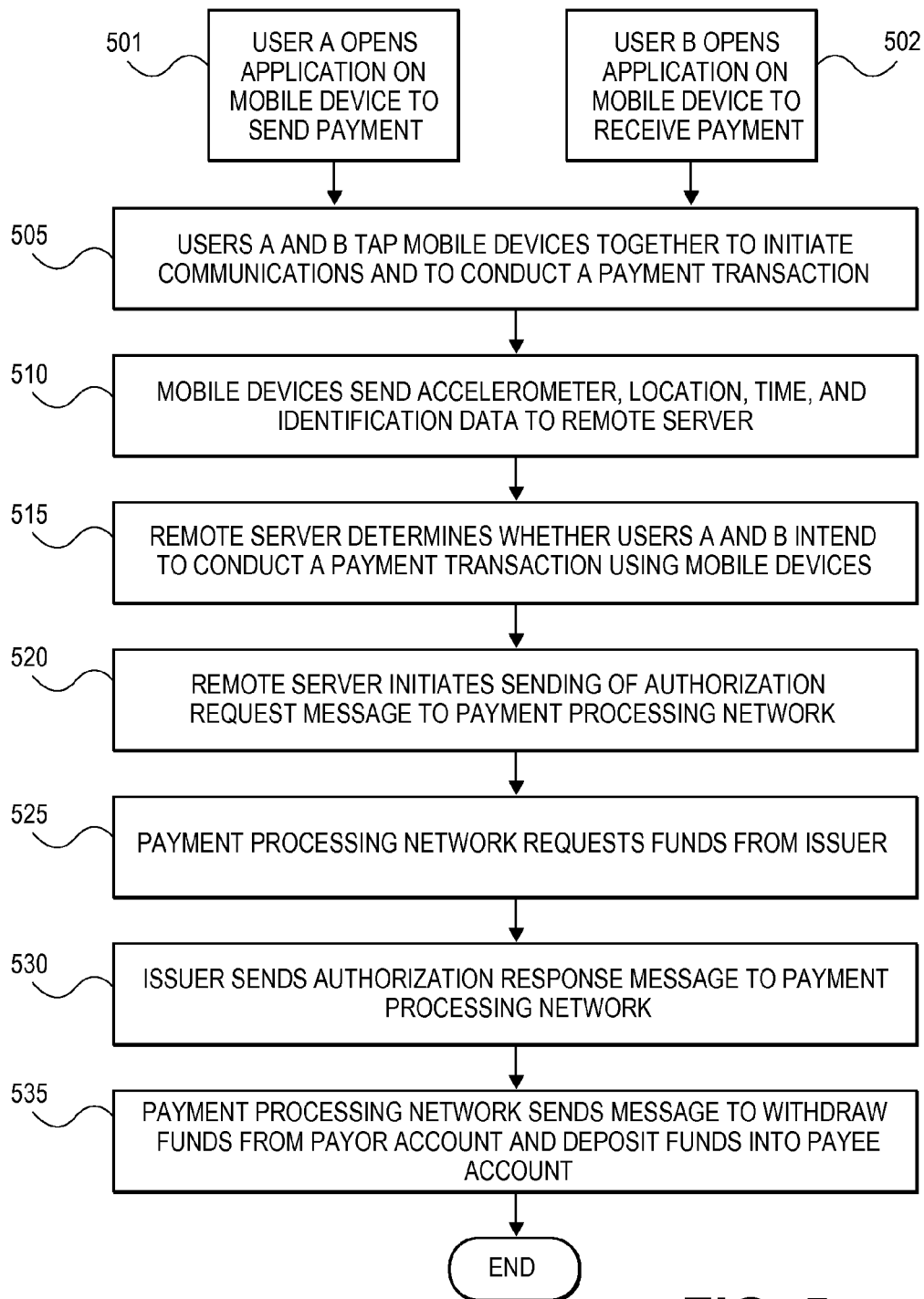
FIG. 5 is a high level flow diagram illustrating one embodiment of a method of processing a transaction in accordance with the present invention.

FIG. 5 is a high level flow diagram illustrating one embodiment of a method of using a mobile device to conduct a financial transaction between two devices that have interacted. In steps 501 and 502, users A (Payor) and B (Payee) open a suitable application on a mobile device. In step 505, users A and B move their devices 101 and 102 together to initiate communications between their devices and conduct a financial transaction. Devices 101 and 102 record accelerometer, location, time, and identification data representative of the respective device's movement. In step 510, this data is sent to the remote server computer 120. In step 515, the remote server computer 120 determines whether users A and B intended to conduct a payment transaction using mobile devices 101 and 102. In step 520, the remote server computer 120 initiates the sending of an authorization request message to payment processing network 130. In another embodiment, for example, if the Payee is a merchant, the Payee device (102) may be in operative communication with an acquiring bank 160. Acquiring bank 160 may initiate the sending of the authorization request message to the payment processing network 130. In this case, the payment processing network 130 forwards the authorization request message to the issuer 150.

In step 525, the payment processing network 130 requests funds from the issuer 150. In step 530, the issuer 150 sends the authorization response message to the payment processing network 130. In step 535, the payment processing network sends the message to withdraw funds from the Payor account and deposit funds into the Payee account.

Figure 6:
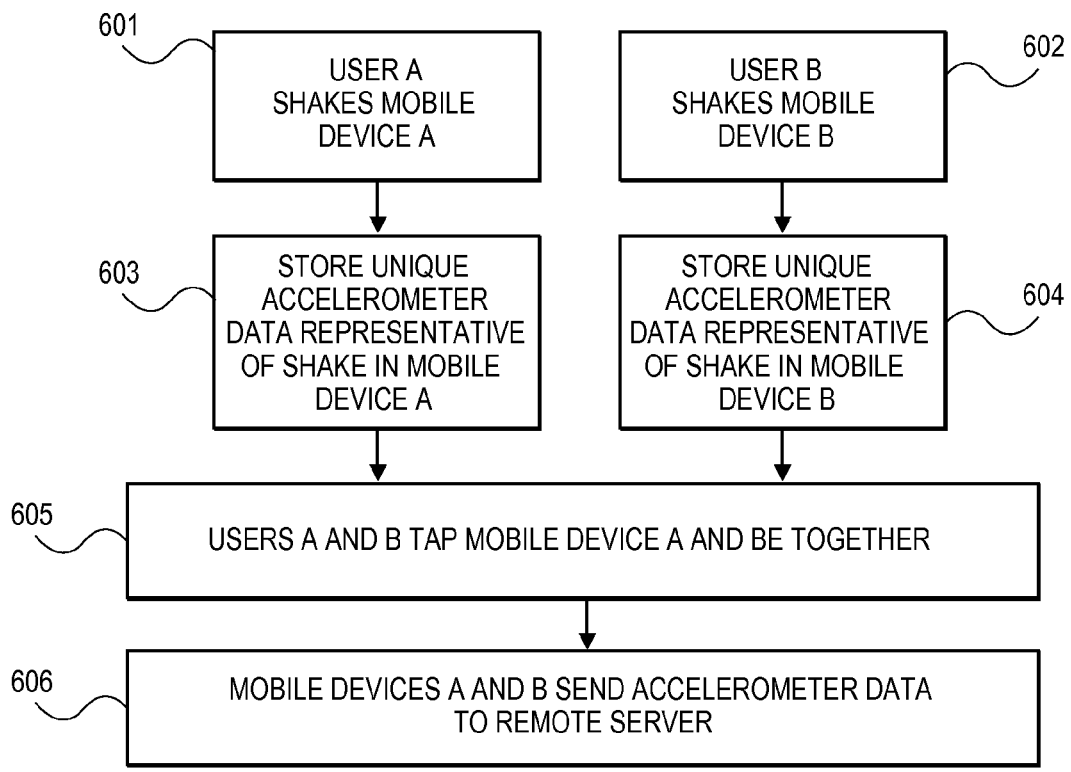
FIG. 6 is a high level flow diagram illustrating one embodiment of a method of processing a transaction in accordance with the present invention.

FIG. 6 is a high level flow diagram illustrating an embodiment of the present invention where at least one of the users shakes, or otherwise intentionally moves, the device to "sign" the transaction. The intentional movement may be a digital signature or motion password indicating approval of the transaction by the user. The intentional movement may be dictated by instructions provided by the user interface.

In step 601, the user of a device shakes a device 101 for a predetermined amount of time (e.g., 1 or 3 seconds) or an amount of time chosen by the user. Accelerometer data is recorded by device 101. In step 602, the user of a device 102 shakes the device for a predetermined amount of time, and accelerometer data is recorded by device 102 In some embodiments, only one of the devices involved in the transaction is shaken to "sign" the transaction.

In some embodiments, the accelerometer data generated by the respective shaking of devices 101 and 102 (in steps 601 and 602) is random according to the how the user decides to shake the device. In this context, shake values are intended to be non-repeatable, or at least very hard to repeat exactly. The accelerometer data may therefore record two uniquely defined events. The accelerometer data may be tied to the time when the movement occurred.

In steps 603 and 604, the accelerometer data generated by the shake is stored on mobile devices 101 and 102. In some embodiments, the shake accelerometer data is stored in non-volatile memory on devices 101 and 102.

In step 605, the users of devices 101 and 102 bump, tap, or otherwise move devices 101 and 102 together. Interaction data, representative of the interaction, is generated by the devices. In step 606, the interaction data is sent to remote server computer 120, where the server computer analyzes the interaction data as previously described.

If the remote server computer 120 determines that an interaction occurred, the interaction data generated by the respective shaking of devices 101 and 102 (in steps 601 and 602) may be combined. The combination of interaction data may be used to sign the transaction using the combination of accelerometer data. Therefore, the interaction data can be bound to the unique event. In other embodiments, the combination of interaction data can be used as a session key for encryption.

In some embodiments, the movement (in steps 601 and 602) is the same or substantially similar to a "motion password" created by the user. The motion password may be previously defined by the user. The motion password is a specific movement, or sequence of movements, that, the user knows, can repeat, and therefore use the motion password in lieu of a PIN or alphanumeric password. For example, the motion pattern may be a series of taps or a specific gesture or motion set by the user. In other embodiments, the user interface of the device prompts the user to move the device in a particular way. For example it may prompt the user to shake the device for an amount of time (e.g., one second), followed by a movement sequence of left, down, up.

The accelerometer data generated by the respective shaking of devices 101 and 102 and/or a combination of the accelerometer data from the shaking of devices 101 and 102 can be used to sign a transaction, for non-repudiation, as a substitution for a physical signature, to encrypt a data payload, or as a secure key for the transaction.

III. Exemplary User Interface

Figure 7A:
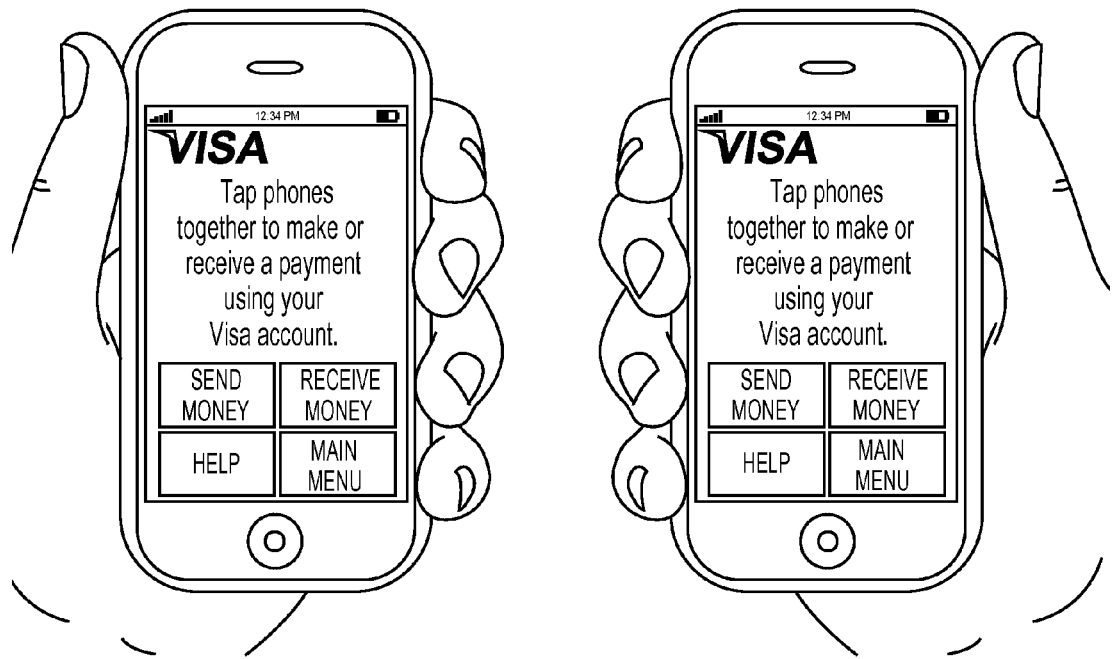
FIGS. 7a-e depict exemplary user interfaces according to one embodiment of the present disclosure.

FIG. 7a depicts an exemplary user interface of an application running on devices 101 and 102. In some embodiments, after users of devices 101 and 102 first launch the application, users are presented with a user interface as illustrated. The screen depicted instructs the user of each respective device to "tap" the devices together to make or receive a payment. While the application is running on devices 101 and 102, the remote server computer 102 may be actively monitoring communications from devices 101 and 102. In other embodiments, the remote server computer does not actively monitor communications, and only analyzes the interaction data from devices 101 and 102 when the interaction data is "pushed" onto remote server computer 120 from the respective devices.

Figure 7B:
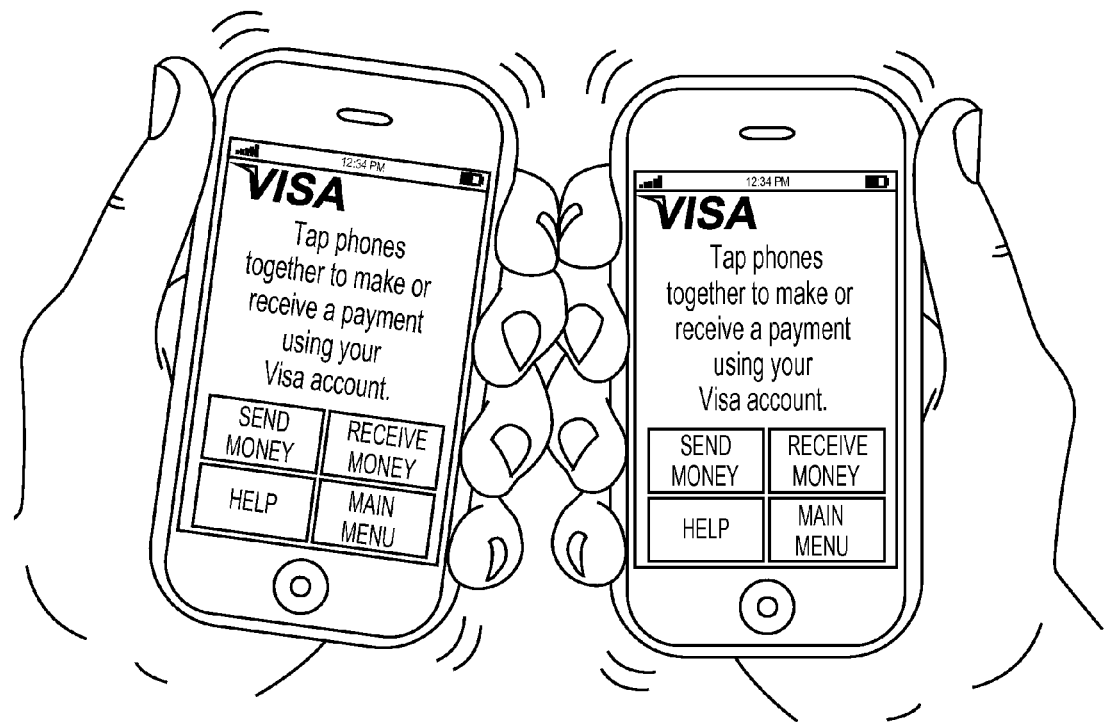
Figure 7C:
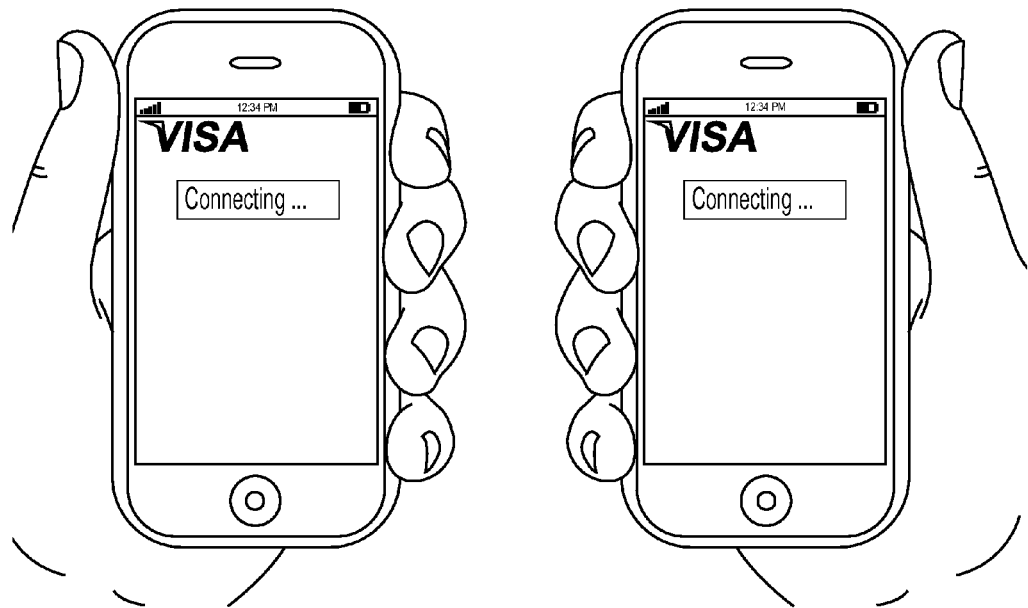
Figure 7D:
Figure 7E:

FIG. 7B shows two devices 101 and 102 just before the devices "bump" or "tap" together. FIG. 7C shows devices 101 and 102 just after the devices "bump" or "tap" together. FIG. 7D shows devices 101 and 102 after remote server computer 120 has connected the two devices. In some embodiments, the users of devices 101 and 102 may be presented with the option to send or receive money to/from the device they are connected with. Operator of device 101 may choose either to send or receive payment. Operator of device 102 may also choose to send or receive payment. FIG. 7E shows one embodiment where the operator of device 101 (Jill) selected "Send Money" when connected with the operator of device 102 (Jack). Operator of device 101 may choose the payment amount and the transaction account to use as the source of funds for payment. Operator of device 102 may choose the transaction account to use as the destination account, where money will be deposited. Transaction accounts may be selected using a drop down menu of accounts that are associated with the respective user of device 101 and 102. An operator of a device may be permitted to add a new card during the transaction, if the desired source or destination account is not in the drop down menu. A default transaction account may be used if no account is provided during the transaction.

Figure 8C:
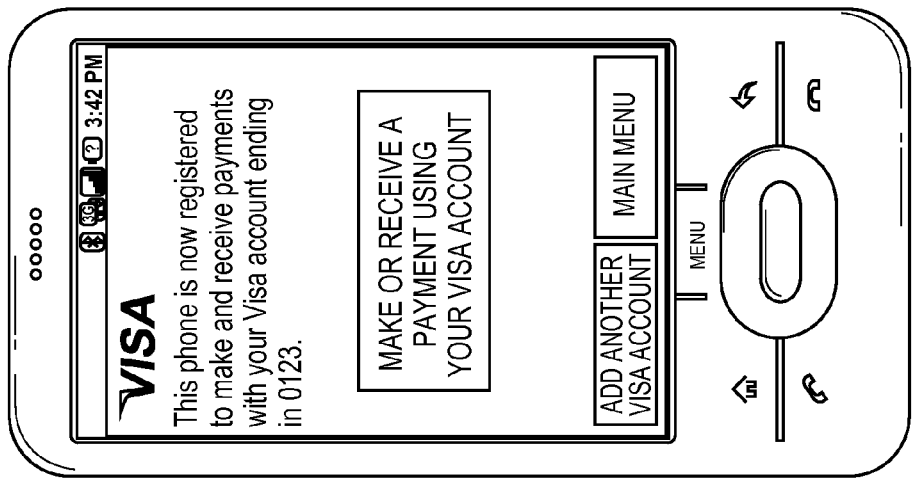
FIGS. 8a-c depict exemplary user interfaces according to one embodiment of the present disclosure.
Figure 8B:
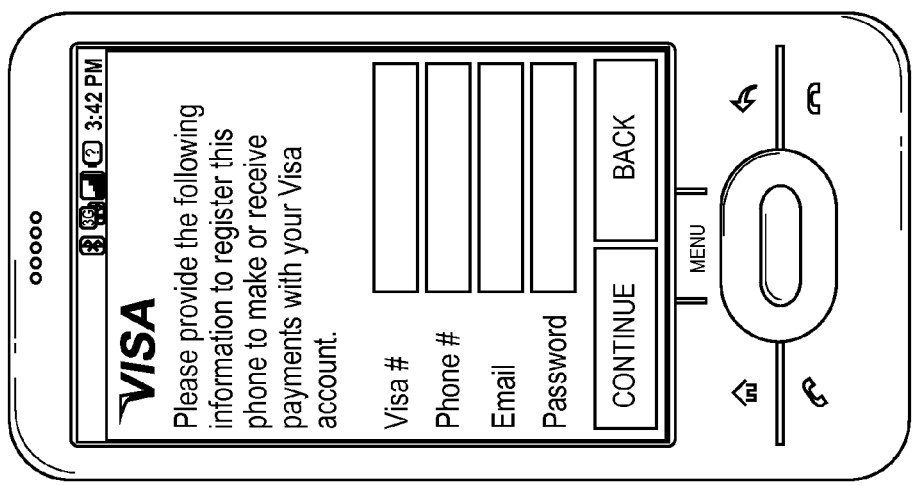
Figure 8A:
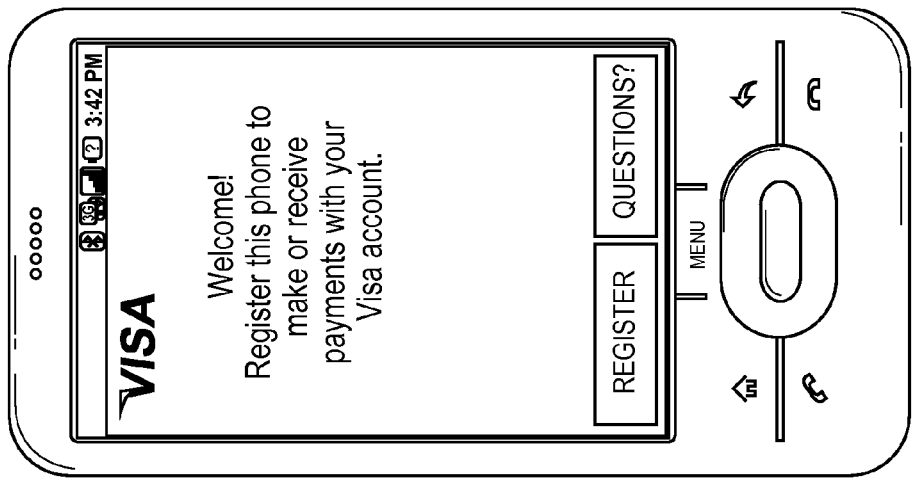

In some embodiments of the present invention, the user of device 101 must register the device. Registration may occur through a suitable application running on the device or using the internet. FIGS. 8a-c illustrate the user interface used for registering the phone. FIG. 8a shows the "Welcome" screen where the user can choose to register mobile phone 101. FIG. 8b shows data entry fields that may be used in some embodiments. When the customer enters her Visa number and phone number, the enrollment database 270 stores this information in a lookup table. Other information may be stored in the enrollment database 270 or accounts database 260. FIG. 8c confirms the information entered in FIG. 8b has been accepted and that the Visa account ending in 0123 has been associated with the device 101. The user of device 101 may associate additional financial accounts with device 101 by selecting the "Add Another Visa Account" button.

After enrollment, information about the enrolled device is correlated with transaction account information. For example, enrollment database 270 (FIG. 2) is updated with device information from mobile phone 101 and transaction account information from accounts database 260.

FIG. 9a shows an exemplary user interface for an embodiment where accelerometer data is used to "sign" a transaction. FIG. 9 corresponds to steps 601 or 602 in FIG. 6. The user prompt to shake the device to sign or verify the transaction could alternatively occur after step 605. After the operator of device 101 shakes or otherwise moves the device beyond a predetermined threshold for a predetermined amount of time (e.g., 1-5 seconds), first movement security data is created and stored (steps 603 and 604). The financial transaction can then proceed as described above. The first movement security data may be used for non-repudiation.

FIG. 9b shows an exemplary user interface for an embodiment where accelerometer data is used as a "motion password" to confirm that the identify of the user or that the user is authorized to use the device. In this embodiment, the device can be used to create unique authentication data representative of the user's movement of device 901. The accelerometer data generated by unique movement is used to authenticate the user in a manner similar to entering a signature of one's name, PIN, or a username/password. After the motion password is verified, the transaction can continue as described above.

For example, prior to engaging in a financial transaction, the user may have created a motion password in the set up process. The user may set up his device and authentication data using any combination of a device, personal computer, or access point. During setup, the user is prompted to create a digital signature that is representative of a unique movement of the user moving the device. The motion password can be any combination of movement and pauses in movement. When the user is prompted to create a motion password, the accelerometer records accelerometer data representative of the movement, which is stored for future reference and comparison. Then, when the user participates in a financial transaction, the user interface of a software application running on the device prompts the user to enter the pre-set motion password. The accelerometer records the acceleration data, which is then compared to the accelerometer data from the pre-set motion password. If the data matches, the transaction may continue.

The accelerometer data representative of the unique movement may include several data points. Accelerometer data may include direction of the movement. That is, it may include information indicating whether the device was moved left or right or up or down, or combinations thereof. Accelerometer data may include magnitude of acceleration. Accelerometer data may include time measurements (e.g., if a user holds the device still for an amount of time before, after, or in between other movements).

For example, accelerometer data can be used to provide a unique signature by bumping another device a predetermined number of times in a predetermined manner. For example, a person can take his device and can: a) bump the phone against a terminal a first time; b) wait for 1 second; c) bump the terminal a second time; d) wait for three seconds, and e) bump the terminal a third time. This unique pattern can be indicative of a particular signature of a particular person.

In one embodiment, a person could use a device, such as 901, at an ATM in order to authenticate himself to the ATM. For example, the user could bump a touch pad at the ATM to start an interaction and identify himself to the ATM. The ATM may then prompt the user to move his device in a unique way. The user then moves the device according to the unique movement chosen by the user during setup. For example, the user might move the device up very fast (e.g., greater than 10 meters per second per second), left slowly (e.g., less than 0.5 meters per second per second), follow up three brief shakes (e.g., up, down, up within a 1 second period of time). Since a user's general movement may be visible to bystanders, the device's user interface may ask the user to orient the phone in a specific way in the user's hand that would not be visible to a bystander. For example, the user interface may prompt the user to turn the device upside down when performing the unique pattern.

In one embodiment, a person could use a device, such as 901, at a POS terminal in order to complete a transaction. In some embodiments, the digital signature is used in lieu of entering in a PIN at a POS terminal.

FIG. 9c shows an exemplary user interface for an embodiment where the user is prompted to move the device in a specific manner, as prompted by the user interface of an application running on the device. As illustrated, the user interface prompts user of device 901 to move the device first to the left, then downward, and then to shake the device. Accelerometer data is then used to determine whether the user performed the sequence of movements, and thus has confirmed its willingness to conduct the transaction at hand. After the user moves the device in the specified manner, the transaction can continue as described above.

The user interfaces depicted in FIGS. 7-9 show various buttons or keys ("Help," "Main Menu," "Cancel," etc.). However, those skilled in the art will recognize that there are many other variations that could be employed without departing from the scope of the invention. Although devices 101 and 102 are depicted as mobile phones, the devices can be any mobile device with an accelerometer.

IV. Exemplary Device

Figure 10:
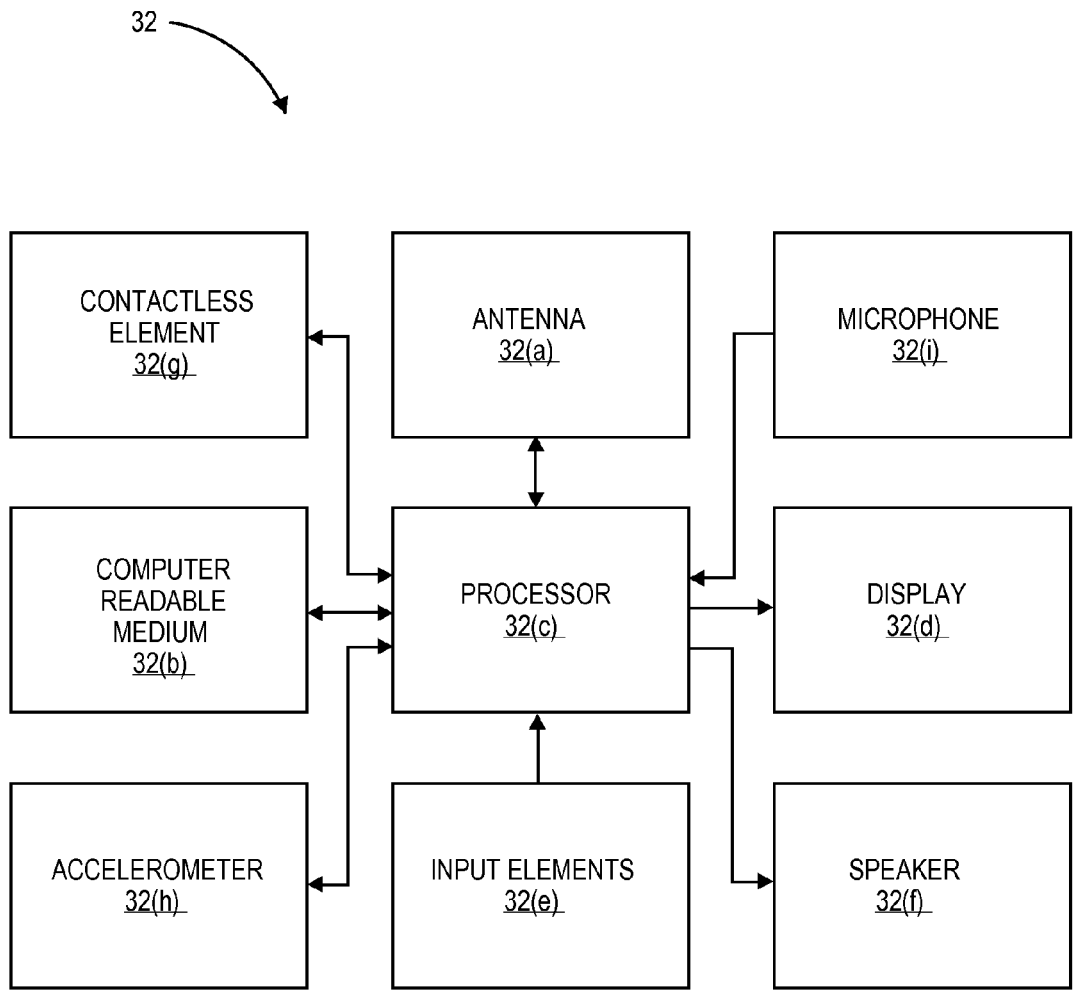
FIG. 10 shows a block diagram of a device in accordance with the present disclosure.

FIG. 10 shows a diagram of some components in an exemplary mobile device. Whether or not a mobile phone is used, devices 101 and 102 may include one or more of the features shown in FIG. 10. If one of device 101 and 102 is a POS device, it may include one or more of the features in FIG. 5 as well. However, in addition to the elements shown in FIG. 5, an exemplary POS device may also include a network interface as well as a reader (e.g., a card reader such as a magnetic stripe reader) for reading data from contactless or contact based cards or phones.

An exemplary mobile device 32 in the form of a phone (which may also serve as an access device in some embodiments) may comprise a computer readable medium and a body. (FIG. 10 shows a number of components, and the mobile devices according to embodiments of the invention may comprise any suitable combination or subset of such components.) The computer readable medium 32(b) may be present within the body (not shown), or may be detachable from it. The body may be in the form a plastic substrate, housing, or other structure. The computer readable medium 32(b) may be a memory that stores data and may be in any suitable form including a magnetic stripe, a memory chip, uniquely derived keys, encryption algorithms, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the mobile device 32.

Information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The mobile device 32 may further include a contactless element 32(g), which is typically implemented in the form of a semiconductor chip (or other data storage element) with an associated wireless transfer (e.g., data transmission) element, such as an antenna. Contactless element 32(g) is associated with (e.g., embedded within) mobile device 32 and data or control instructions transmitted via a cellular network may be applied to contactless element 32(g) by means of a contactless element interface (not shown). The contactless element interface functions to permit the exchange of data and/or control instructions between the mobile device circuitry (and hence the cellular network) and an optional contactless element 32(g).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth, infra-red, or other data transfer capability that can be used to exchange data between the mobile device 32 and an interrogation device. Thus, the mobile device 32 is capable of communicating and transferring data and/or control instructions via both a cellular network and a near field communications line or network.

The mobile device 32 may also include a processor 32(c) (e.g., a microprocessor) for processing the functions of the mobile device 32 and a display 32(d) to allow a consumer to see phone numbers and other information and messages. The mobile device 32 may further include input elements 32(e) to allow a consumer to input information into the device, a speaker 32(f) to allow the consumer to hear voice communication, music, etc., and a microphone 32(i) to allow the consumer to transmit her voice through the mobile device 32. The mobile device 32 may also include an antenna 32(a) for wireless data transfer (e.g., data transmission), and an accelerometer 32(h) which can provide acceleration data to the processor 32(c).

V. Exemplary System Elements

The various participants and elements in FIGS. 1-3 may operate or use one or more computer apparatuses to facilitate the functions described herein. Any of the elements in FIG. 1 (e.g., the devices 101, 102, the remote server computer, the payment processing network 130, the issuers 140, 150, the acquirer 160, etc.) may use any suitable number of subsystems to facilitate the functions described herein. Examples of such subsystems or components are shown in FIG. 11, which may illustrate parts of a computer apparatus.

The subsystems shown in FIG. 11 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl, using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

VI. Technical Advantages

There are numerous technical advantages to the embodiments of the present invention. The present invention may use existing payment card infrastructure that is used to process debit and credit card transactions. Debit and credit cards offer protections against fraud, solutions to mitigate risk, and the ability to issue chargeback for unauthorized purchases. Additionally, debit and credit card are nearly universally accepted at merchants, thus making embodiments of the invention more universally acceptable.

For example, if a Payor is using a device with an accelerometer for payment at a merchant, the location of the merchant can be compared against the location of the mobile device. If the locations do not match, this may indicate a fraudulent transaction. Location data just before the transaction can be compared to the location data during the transaction to see if the location data is consistent with the device actually being present at the location of the transaction (as opposed to characteristics of the device being cloned).

Time data may also be used to detect fraud. If the server computer detects repeated, unsuccessful interaction data from a device, a risk score indicating a higher amount of risk can be assigned to the device generating a repeated, unsuccessful interaction data because this might be indicative of a fraudster trolling for financial information.

The use of an authorization message is beneficial because it allows financial institutions to make informed decisions about whether to authorize or deny a transaction. Since the authorization message, in some embodiments of the present invention, includes unique transaction data (acceleration, time, and/or location data), financial institutions have more data to base their risk mitigation decisions.

Embodiments of the present invention allow transactions directly between two transaction accounts without having to provide account details to the Payor or Payee. Other embodiments of the invention allow any transaction account maintained by an issuer to be the source or destination account. Current systems, for example, PayPal™, only permit transactions directly to and from a user's PayPal account and require intermediate transfer of funds from the user's bank or credit account.

Existing systems further do not permit transfer of funds by a third party into a credit account. Embodiments of the present invention allow for deposit of funds by a third party into a credit account. This is beneficial to credit account holder because it eliminates intermediate transactions (e.g., deposit into checking followed by a money transfer or bill pay to the credit account). This is beneficial to the issuer of the credit account because it eliminates, or partially eliminates, the "float" to the customer on the credit account. In the aggregate eliminating the "float" may save the issuer a significant amount of money.

Embodiments of the present invention allow funds to be deposited directly into one of a plurality of transaction accounts. The transaction accounts may be issued by a number of issuers. Further, the transaction accounts may be any of number types of transactions accounts.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method of conducting a financial transaction, the method comprising:

receiving, at a remote server computer, first accelerometer data and first geo-location data from a first mobile device, wherein the first mobile device comprises a first processor, a first geo-location unit coupled to the first processor, and a first accelerometer coupled to the first processor;

receiving, at the remote server computer, second accelerometer data and second geo-location data from a second mobile device, wherein the second mobile device comprises a second processor, a second geo-location unit coupled to the second processor, and a second accelerometer coupled to the second processor;

receiving, at the remote server computer from one of the first and second mobile devices, third accelerometer data that is used as movement security data to authenticate or verify the financial transaction, wherein the third accelerometer data is different than the first and second accelerometer data;

receiving, at the remote server computer, timestamp data from the first and second mobile devices, wherein the time stamp data includes a plurality of at least three time points corresponding to a plurality of at least three acceleration values in the accelerometer data of the respective mobile device;

receiving, at the remote server computer, a payment amount from at least one of the first mobile device or the second mobile device;

analyzing, by the remote server computer, first geo-location data and second geo-location data to determine whether the first and second device are within a threshold distance of one another;

analyzing, by the remote server computer, first accelerometer data and second accelerometer data and the timestamp data to determine whether the first mobile device moved towards the second mobile device; and responsive to determining that the first and second mobile devices are within the threshold distance of one another and that the first and second mobile devices moved towards each other, initiating the transmission of an authorization request message to a first issuer, wherein the first issuer approves or does not approve the authorization request message.

2. The method of claim 1 wherein at least one of the geo-location data or the timestamp data is used for fraud or risk analysis.

3. The method of claim 1 wherein the first device is associated with a first transaction account issued by the first issuer and the second device is associated with a second transaction account issued by a second issuer.

4. The method of claim 3 wherein, if the first issuer approves the authorization message, the payment amount is debited from the first transaction account and deposited into the second transaction account.

5. The method of claim 4 wherein the second transaction account is a credit account.

6. The method of claim 3 wherein the second device is associated with a third transaction account.

7. The method of claim 6 wherein, if the first issuer approves the authorization message, the payment amount is debited from the first transaction account and deposited into the second transaction account or the third transaction account, as selected by an operator of the second device.

8. The method of claim 1 wherein initiating the transmission of an authorization message to the first issuer comprises sending a message to an acquiring bank.

9. The method of claim 1, wherein the third accelerometer data is used as a seed for encryption.

10. The method of claim 1, wherein the authorization request message includes a key derived from the third accelerometer data.

11. A first phone comprising:
a first processor;
a first accelerometer coupled to the first processor;
a first geo-location unit coupled to the first processor;
a first antenna coupled to the first processor; and
a non-transitory computer readable medium coupled to the first processor, the computer readable medium comprising code for implementing a method comprising:
prompting a user of the first phone to move the first phone to generate movement security data to authenticate the user,
prompting the user of the first phone to move the first phone towards a second phone, wherein the second phone comprises a second processor, a second accelerometer coupled to the second processor, and a second geo-location unit coupled to the second processor,
generating and storing first interaction data associated with the movement of the first phone towards the second phone, wherein the first interaction data includes first accelerometer data, first timestamp data, and first geo-location data, the first timestamp data including a plurality of at least three time points corresponding to a plurality of at least three acceleration values in the first accelerometer data; and
sending, with the first antenna, payment information to a remote server computer, and
sending, with the first antenna, the first interaction data to the remote server computer, wherein the remote server computer is configured to compare the first interaction data to second interaction data generated by the second phone, determine whether the first and second interaction data are within a predetermined threshold, and initiate the generation of an authorization message if the first and second interaction data are within the predetermined threshold, wherein the second interaction data includes second accelerometer data, second timestamp data, and second geo-location data.

12. The first phone of claim 11 wherein payment information comprises a payment amount, payor information, and payee information.

13. The first phone of claim 12 wherein the financial transaction is conducted between a payor transaction account associated with one of the first or second phones, and a payee transaction account associated with the other of the first or second phones.

14. The first phone of claim 13 wherein the payment amount is debited from the payor transaction account and credited to the payee transaction account.

15. The first phone of claim 14 wherein the payee transaction account is a debit or credit account or an interest bearing account.

16. The first phone of claim 11, wherein the movement security data is used as a seed for encryption.

17. The first phone of claim 11, wherein the authorization request message includes a key derived from the movement security data.

18. A non-transitory computer readable medium, comprising code including instructions, configured to cause a processor to:
receive first accelerometer data and first geo-location data from a first mobile device, wherein the first mobile device comprises a first processor, a first accelerometer coupled to the first processor, and a first geo-location unit coupled to the first processor;
receive second accelerometer data and second geo-location data from a second mobile device, wherein the second mobile device comprises a second processor, a second accelerometer coupled to the second processor, and a second geo-location unit coupled to the second processor;
receiving movement security data from one of the first and second mobile devices to authenticate a user of the one of the first and second mobile devices;
receiving timestamp data from the first and second mobile devices, wherein the time stamp data includes a plurality of at least three time points corresponding to a plurality of at least three acceleration values in the accelerometer data of the respective mobile device;
receive payment information from at least one of the first mobile device or the second mobile device;
analyze first geo-location data and second geo-location data to determine whether the first and second device are within a threshold distance of one another;
analyze first accelerometer data and second accelerometer data and the timestamp data to determine whether the first mobile device moved towards the second mobile device; and
responsive to determining that the first and second mobile devices are within the threshold distance of one another and that the first and second mobile devices moved towards each other, initiate the transmission of an authorization request message to a first issuer, wherein the first issuer approves or does not approve the authorization request message.

19. The non-transitory computer readable medium of claim 18, wherein at least one of the geo-location data or the timestamp data is used for fraud or risk analysis.

20. The non-transitory computer readable medium of claim 18, wherein the first device is associated with a first transaction account issued by the first issuer and the second device is associated with a second transaction account issued by a second issuer.

21. The non-transitory computer readable medium of claim 20, wherein, if the first issuer approves the authorization message, the payment information includes a payment amount that is debited from the first transaction account and deposited into the second transaction account.

22. The non-transitory computer readable medium of claim 21, wherein the second transaction account is a credit account.

23. The non-transitory computer readable medium of claim 18, wherein initiating the transmission of an authorization message to the first issuer comprises sending a message to an acquiring bank.

24. The non-transitory computer readable medium of claim 18, wherein payment information comprises a payment amount, payor information, and payee information.

25. The non-transitory computer readable medium of claim 18, wherein the movement security data is used as a seed for encryption.

26. The non-transitory computer readable medium of claim 18, wherein the authorization request message includes a key derived from the movement security data.

* * * * *